United States Patent
Romero et al.

(10) Patent No.: US 12,065,791 B2
(45) Date of Patent: Aug. 20, 2024

(54) SYSTEMS AND METHODS FOR MANAGING A WORKSITE BASED ON BATTERY POWER

(71) Applicant: Caterpillar Paving Products Inc., Brooklyn Park, MN (US)

(72) Inventors: Francisco Romero, Edina, MN (US); John L. Marsolek, Watertown, MN (US); Brian R. Dershem, Naperville, IL (US); Jonathan A. Anderson, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 389 days.

(21) Appl. No.: 17/498,104

(22) Filed: Oct. 11, 2021

(65) Prior Publication Data

US 2023/0113279 A1  Apr. 13, 2023

(51) Int. Cl.
| | | |
|---|---|---|
| *E01C 19/48* | (2006.01) | |
| *E01C 19/28* | (2006.01) | |
| *G05B 15/02* | (2006.01) | |
| *E01C 19/02* | (2006.01) | |
| *G06Q 10/0631* | (2023.01) | |

(52) U.S. Cl.
CPC ............ *E01C 19/48* (2013.01); *E01C 19/282* (2013.01); *G05B 15/02* (2013.01); *E01C 19/02* (2013.01); *E01C 2301/00* (2013.01); *G06Q 10/06315* (2013.01)

(58) Field of Classification Search
None
See application file for complete search history.

(56) References Cited

U.S. PATENT DOCUMENTS

| | | | |
|---|---|---|---|
| 9,611,595 B2 | 4/2017 | Marsolek et al. | |
| 2011/0180104 A1* | 7/2011 | Riach | G01C 21/3469 |
| | | | 134/6 |
| 2021/0008997 A1 | 1/2021 | Marsolek | |
| 2021/0110719 A1 | 4/2021 | Subramanian et al. | |

FOREIGN PATENT DOCUMENTS

| | | |
|---|---|---|
| JP | 2012019639 A | 1/2012 |
| WO | WO2020065996 A1 | 4/2020 |
| WO | WO2020174261 A1 | 9/2020 |

* cited by examiner

*Primary Examiner* — Tamara L Weber

(57) ABSTRACT

Systems and methods determine a current production rate of a piece of equipment processing first paving material at a worksite, receive first information indicative of an amount of power within a battery of the piece of equipment, receive second information indicative of a characteristic of the worksite, and determine predicted production rate of the piece of equipment to process second paving material at the worksite. The systems and methods further determine an amount of power required by the piece of equipment to process the second paving material at the worksite and determine that the amount of power within the battery of the piece of equipment is insufficient for the amount of power required by the piece of equipment to process the second paving material at the worksite.

19 Claims, 6 Drawing Sheets

SYSTEMS AND METHODS FOR MANAGING A WORKSITE BASED ON BATTERY POWER

TECHNICAL FIELD

The present disclosure relates to a system and method for managing a paving operation, and more particularly, for utilizing power within batteries of equipment at a paving worksite for managing the paving operation.

BACKGROUND

Paving operations involve the use of various machines and/or types of machines. For example, haul trucks may transfer paving material from a plant to a worksite whereby the paving material is transferred to a paving machine. The paving machine is configured to deposit a mat of paving material and one or more compacting machines may compact the mat into a surface for use by vehicles, pedestrians, and the like. Conventionally, the various machines are powered via an internal combustion power sources (e.g., natural gas, petroleum, etc.). With the increasing focus on sustainability, however, machines may additionally or alternatively include electronic power sources (e.g., batteries).

Managing an available amount of power within battery-powered machines introduces some challenges. For example, batteries may take a longer amount of time to recharge, as compared to conventional combustion power sources in which the machines are refueled. Such delays may result in defects to the mat, for example, if the paving material cools and/or hardens. Additionally, such delays may cause inefficiencies at the worksite.

One example of a power management system is described in International Publication No. 2020/174261 (hereinafter referred to as the '261 reference). The '261 reference describes a process for obtaining a planned operating profile of a machine, generating a predicted power expenditure schedule for the machine, and determining that a predicted energy expenditure of the machine exceeds an available energy. In turn, the '261 reference describes generating a modified operating profile and then operating the machine according to the modified operating profile. However, the '261 reference does not describe the ability to manage a fleet of machines operating at a worksite, and monitoring the individual energy expenditures of machines. As a result, the systems described in the '261 reference are not configured to determine, for each machine, whether the machine is capable of processing paving material at the worksite. This, in turn, results in paving mat defects at the worksite and/or a delay in processing the paving material.

Examples of the present disclosure are directed toward overcoming one or more of the deficiencies noted above.

SUMMARY

According to a first aspect, a system comprises one or more processors; and one or more non-transitory computer-readable media storing computer-executable instructions that, when executed by the one or more processors, cause the one or more processors to perform acts comprising: receiving first data associated with paving material being prepared for a worksite at a paving material plant; receiving second data associated with a first amount of power within a battery of a machine operating at the worksite; receiving third data associated with one or more operating parameters of the machine to perform an operation at the worksite; determining, based at least in part on the first data and the third data, a second amount of power for the machine to complete the operation; determining that the first amount of power is less than the second amount of power; determining, based at least in part on the first amount of power being less than the second amount of power, an action to be performed at the worksite or the paving material plant; causing performance of the action; and causing a notification of the action to be output on at least one of a first device associated with the machine or a second device associated with the paving material plant.

According to a further aspect, a method comprises determining a current production rate of a piece of equipment processing first paving material at a worksite; receiving first information indicative of an amount of power within an energy storage device of the piece of equipment; receiving second information indicative of a characteristic of the worksite; determining, based at least in part on the current production rate, the first information, and the second information, a predicted production rate of the piece of equipment to process second paving material at the worksite; determining, based at least in part on the predicted production rate of the piece of equipment, an amount of power required by the piece of equipment to process the second paving material at the worksite; determining that the amount of power within the energy storage device of the piece of equipment is insufficient for the amount of power required by the piece of equipment to process the second paving material at the worksite; and causing an action to be performed associated with reducing paving mat defects at the worksite.

According to another aspect, a method comprises determining a first amount of power within a first energy storage device of a first piece of equipment operating at a worksite; determining a second amount of power within a second energy storage device of a second piece of equipment operating at the worksite; determining a first operating parameter of the first piece of equipment; determining a second operating parameter of the second piece of equipment; determining, for the first piece of equipment and based at least in part on the first operating parameter, a third amount of power for the first piece of equipment to perform a first operation associated with processing paving material at the worksite; determining, for the second piece of equipment based at least in part on the second operating parameter, a fourth amount of power for the second piece of equipment to perform a second operation associated with processing the paving material at the worksite; determining that at least one of: the first piece of equipment is unable to perform the first operation based at least in part on the third amount of power being greater than the first amount of power, or the second piece of equipment is unable to perform the second operation based at least in part on the fourth amount of power being greater than the second amount of power; and causing output of a notification that indicates at least one of: the first piece of equipment is unable to perform the first operation, or the second piece of equipment is able to perform the second operation.

BRIEF DESCRIPTION OF THE DRAWINGS

The detailed description is described with reference to the accompanying figures. In the figures, the left-most digit or digits of a reference number identifies the figure in which the reference number first appears.

DETAILED DESCRIPTION

Wherever possible, the same reference numbers will be used throughout the drawings to refer to the same or like parts.

Figure 1:
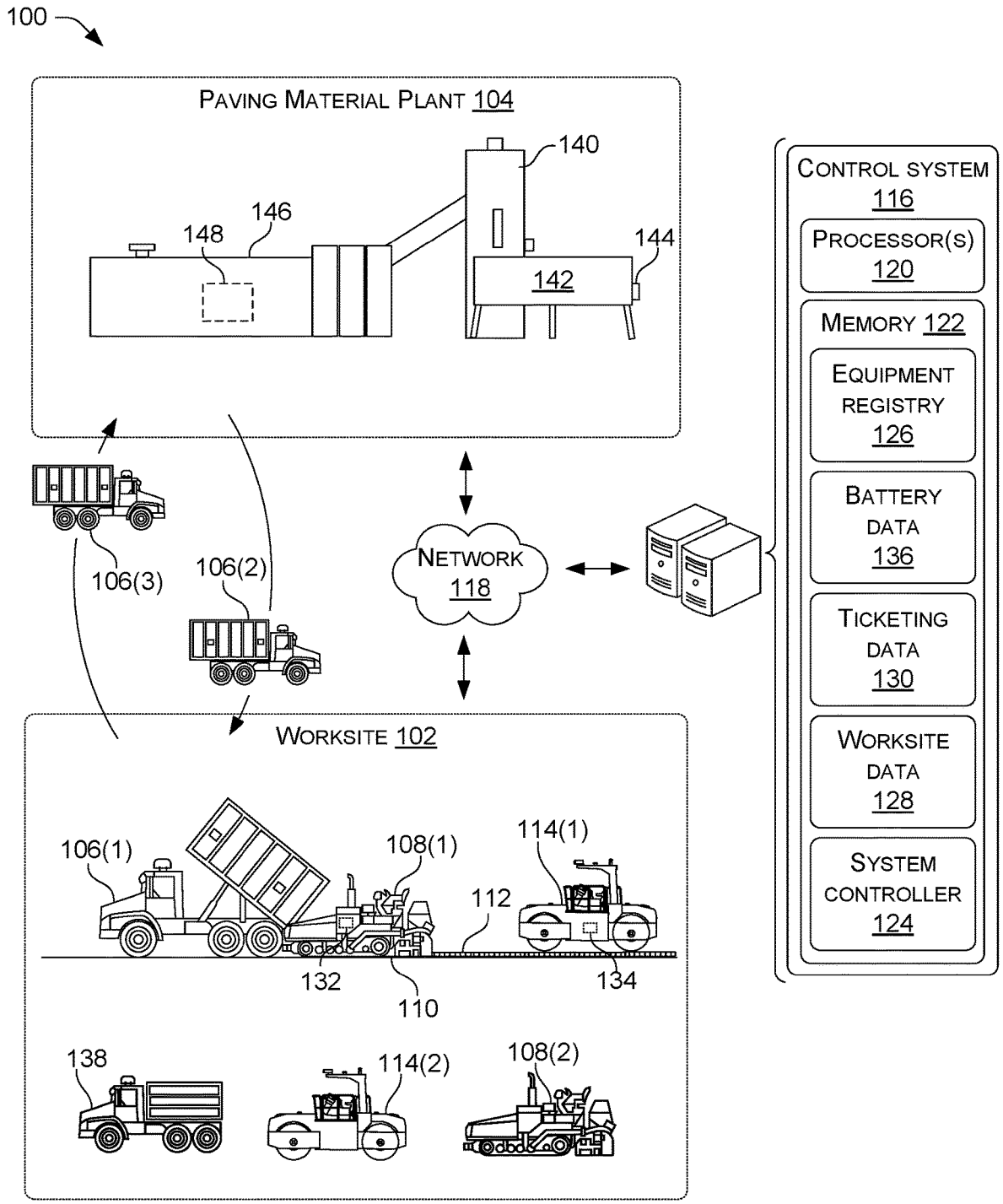
FIG. 1 illustrates an example paving system, including a worksite, pieces of equipment operating at the worksite, a paving material plant, and a control system for controlling operations of the paving system, according to an embodiment of the present disclosure.

FIG. 1 illustrates an example paving system 100, an example worksite 102, and a paving material plant 104. In some examples, the paving system 100 includes one or more of the worksite 102, the paving material plant 104, and/or one or more machines or other equipment disposed at the worksite 102 and/or at the paving material plant 104. As will be described herein, in some examples various paving operations, mining operations, construction operations, or other operations are performed, at least in part, at the worksite 102 and/or at the paving material plant 104.

The paving material plant 104 prepares paving material for the worksite 102 (and/or other worksite(s)). The paving material may be, for example, asphalt, heated asphalt, concrete, bitumen, aggregate, or any other material suitable for being distributed on a surface to provide a hardened surface suitable for pedestrian and/or vehicle traffic. The paving material is often produced in batches with each batch sorted or held in a separate storage or holding location, such as a silo, until loaded into one or more haul trucks 106 at a loading station of the paving material plant 104.

The one or more haul trucks 106 are configured to receive and transport loads of the paving material to the worksite 102. For example, the one or more haul trucks 106 are loaded with a desired amount of paving material at the paving material plant 104, and the one or more haul trucks 106 deliver the paving material to the worksite 102. The one or more haul trucks 106 are configured to travel along routes, paths, and the like between the paving material plant 104 and the worksite 102, vice versa. As an example, in FIG. 1, a first haul truck 106(1) deposits the paving material at the worksite 102, a second haul truck 106(2) is transporting additional paving material to the worksite 102, and a third haul truck 106(3) is returning to the paving material plant 104 for receiving additional paving material and after depositing the paving material at the worksite 102.

One or more paving machines 108 are present at the worksite 102, and the one or more paving machines 108 are configured to distribute the paving material from the paving material plant 104 onto a surface 110 to provide a hardened surface suitable for pedestrian and/or vehicle traffic. For example, the one or more paving machines 108 spread the paving material into a mat 112 on the surface 110. The one or more paving machines 108 represent any type of paving machine suitable for distributing the paving material onto the surface 110. In FIG. 1, a first paving machine 108(1) is shown receiving the paving material from the first haul truck 106(1).

Additionally, in some examples one or more compacting machines 114 are present at the worksite 102. Such compacting machines 114 are configured to compact the mat 112 of paving material to a desired density. In some examples, the one or more compacting machines 114, such as the first compacting machine 114(1), is configured to follow relatively closely behind the first paving machine 108(1), such that the first compacting machine 114(1) compacts the paving material distributed by the first paving machine 108(1) while the paving material is still relatively hot. In some instances, the one or more compacting machines 114 may represent a "breakdown" compactor having a breakdown drum, an "intermediate" compactor, including an intermediate drum which compacts paving material already compacted at least once by the compacting machine, and/or a "finishing" compactor that includes a finish drum configured to perform a final squeeze of the paving material. Any number of compacting machines 114 may be used for processing the paving material and smoothing the paving material for use by vehicles and pedestrians.

The paving material plant 104 therefore operates to supply loads of paving material for use at the worksite 102, and the one or more haul trucks 106 are be used to pick-up and deliver one or more loads of paving material to the one or more paving machines 108 at the worksite 102, so that the one or more paving machines 108 receive the paving material for distribution on the surface 110. After delivering the paving material, the one or more haul trucks 106, in some examples, return to the paving material plant 104 to pick-up another load of paving material for transport to the worksite 102. In this manner, the paving operation represents a substantially continuous operation, and it may be important to supply the paving material in a substantially continuous manner to the one or more paving machines 108, such that the one or more paving machines 108 distribute the paving material in a substantially continuous manner, for example, to avoid seems in the resulting mat 112. In addition, it may be important to prevent the back-up of the one or more haul trucks 106 containing the paving material, for example, to prevent the paving material from cooling, such that the resulting mat 112 is not adversely affected. As a result, coordination of work between the paving material plant 104, the one or more haul trucks 106, the one or more paving machines 108, and/or the one or more compacting machines 114 (as well as other pieces of equipment) is important for obtaining a finished pavement surface (e.g., the mat 112) having desired characteristics.

A control system 116 is shown that, in some examples, functions to control one or more operations of the paving system 100, such as the worksite 102, the paving material plant 104. In the example shown in FIG. 1, one or more of the paving material plant 104, the one or more haul trucks 106, the one or more paving machines 108, and/or the one or more compacting machines 114 are in communication with the control system 116 via a network 118. The network 118 may be a local area network ("LAN"), a larger network such as a wide area network ("WAN"), or a collection of networks, such as the Internet. Protocols for network communication, such as TCP/IP, may be used to implement the network 118.

In some instances, the control system 116 is located remote from the worksite 102, the paving material plant 104. Alternatively, the control system 116 may be located at the worksite 102, the paving material plant 104. In any of the examples described herein, the functionality of the control system 116 may be distributed so that certain operations are performed at the worksite 102, the paving material plant 104, and other operations are performed remotely. As described in more detail below, the control system 116 and/or components of the control system 116 are used to determine a charge, power supply, or battery power of the one or more paving machines 108, the one or more compacting machines 114, and/or other pieces of equipment at the worksite 102 for use in determining whether to alter a supply paving material to the worksite 102 and/or altering operations at the worksite 102.

For example, the control system 116 is shown including processor(s) 120 and memory 122, where the processor(s) 120 perform various functions and operations determining whether to alter a supply paving material to the worksite 102 and/or altering operation(s) at the worksite 102, and the memory 122 stores instructions executable by the processor(s) 120 to perform the operations described herein. Additionally, a system controller 124 is shown stored in the memory 122. The system controller 124 is an electronic controller that operates in a logical fashion to perform operations, execute algorithms, store and retrieve data and/or other desired operations. The system controller 124 includes or accesses memory, secondary storage devices, processor(s), and any other components for running an application. The system controller 124 may be a single controller or may include more than one controller (such as additional controllers associated with each of the one or more haul trucks 106, the one or more paving machines 108, the one or more compacting machines 114, and/or other machines/components of the paving system 100) configured to control various functions and/or features of the paving system 100. The paving material plant 104, the one or more haul trucks 106, the one or more paving machines 108, electronic devices operable by one or more users, and/or other components of the paving system 100 include respective controllers, and each of the respective controllers are in communication and/or are otherwise be operably connected via the network 118.

The memory 122 is shown storing an equipment registry 126, which represents a database of machines, pieces of equipment, instruments, tools, and the like operating at the worksite 102. The equipment registry 126 stores information associated with the pieces of equipment, such as type (e.g., dozer, compacting machine, haul truck, paving machine, backhoe, grader, etc.), manufacturer, make, model, capabilities, and so forth. The equipment registry 126 is therefore used to understand the pieces of equipment at the worksite 102. The equipment registry 126 may also be used to communication with the pieces of equipment.

The memory 122 is further shown storing worksite data 128 associated with the worksite 102. In some instances, the worksite data 128 is received from the one or more haul trucks 106, the one or more paving machines 108, the one or more compacting machines 114, devices located at or remote from the worksite 102, and so forth. The worksite data 128 may represent characteristic(s) of the worksite 102, such as location, or a geographical area associated with the worksite 102, operations being performed (e.g., grading, paving, etc.), an amount of time in which work has commenced at the worksite 102, an amount of paving material being supplied to the worksite 102 (e.g., during a paving operation), and so forth. The worksite data 128 may also include information associated with operating parameter(s) of the pieces of equipment. For example, the worksite data 128 may indicate a thickness, length, or width of paving material being deposited by the one or more paving machines 108, respectively. The worksite data 128 may also indicate a speed of the one or more paving machines 108 and/or other operating parameter(s) of the one or more paving machines 108, and/or operating parameter(s) of the one or more compacting machines 114 (e.g., vibrating frequency, amount of paving material to compact, speed, etc.).

Ticketing data 130 stored in the memory 122 is received from the paving material plant 104. As explained in more detail herein, the ticketing data 130 includes information associated with one or more loads of paving material supplied by the paving material plant 104, such as, for example, material identification, loaded weight, etc. For example, oftentimes, in a paving operation, the amount of oil, temperature of the paving material, and/or the size of the aggregate is determined based upon the desired characteristics of the paving material and the requirements of each paving operation. Here, the paving material plant 104 generates the ticketing data 130 that includes characteristics of batches of paving material produced. The control system 116 is configured to receive the ticketing data 130 and store the ticketing data 130 in the memory 122.

In some instances, the one or more paving machines 108, the one or more compacting machines 114, and/or other pieces of equipment at the worksite 102 are powered via one or more energy storage devices, such as batteries (e.g., a battery pack or multiple battery packs). The one or more paving machines 108, the one or more compacting machines 114, and/or other pieces of equipment are be configured to operate at the worksite 102 and perform their respective functions using power supplied from the batteries. In some instances, the one or more paving machines 108, the one or more compacting machines 114, and/or other pieces of equipment include respective power electronics for routing, conditioning, and/or supplying power to components thereof. Additionally, in some instances, the one or more paving machines 108, the one or more compacting machines 114, and/or other pieces of equipment may include combustion engines (e.g., petroleum, natural gas, etc.).

Figure 2:
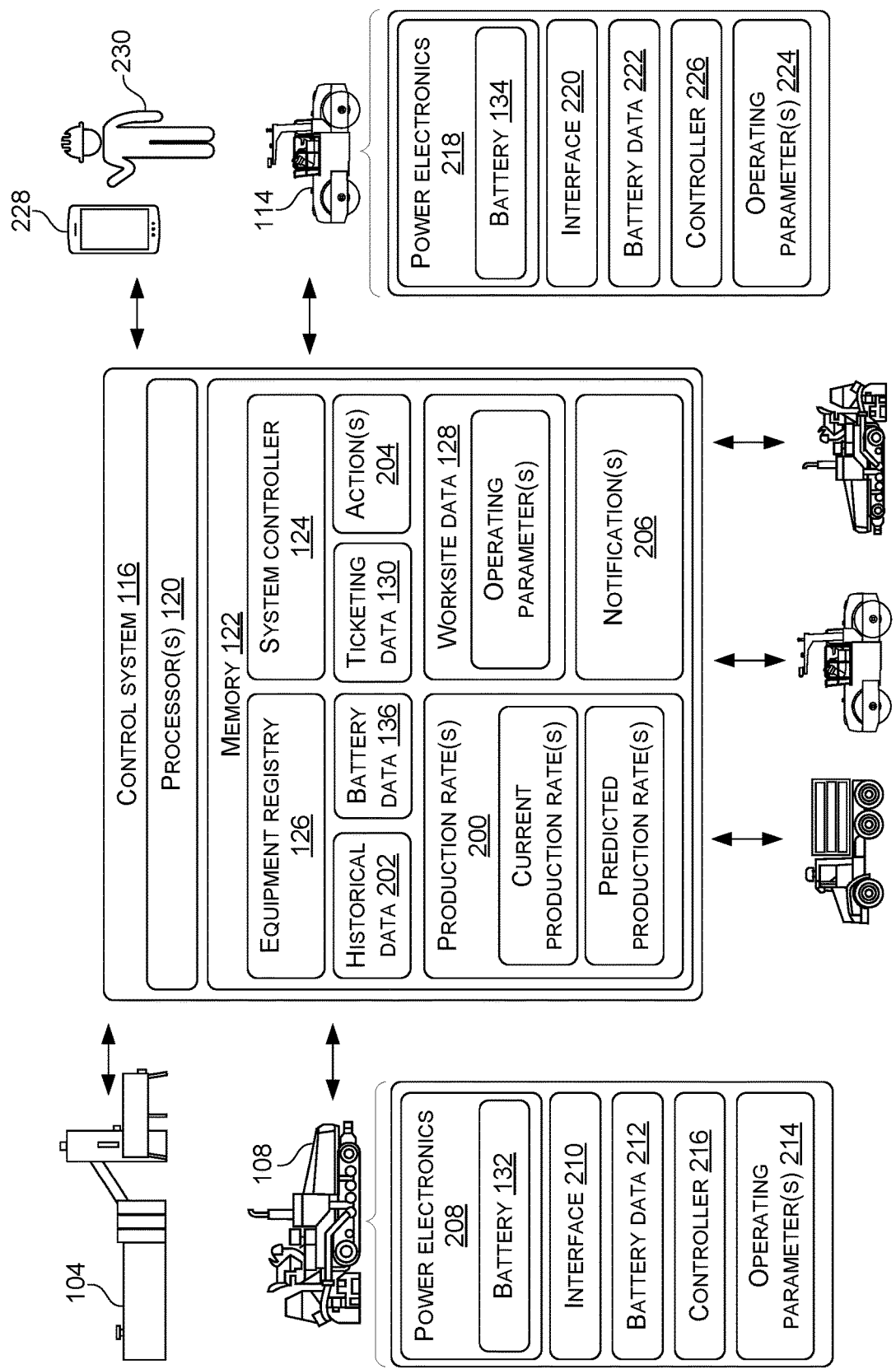
FIG. 2 illustrate example components of the paving system of FIG. 1, according to an embodiment of the present disclosure.

As discussed herein with regard to FIG. 2, each of the one or more paving machines 108, the one or more compacting machines 114, and/or other pieces of equipment at the worksite 102 transmit information (e.g., data) associated with a state of charge, remaining power, and the like of one or more batteries and/or of the one or more battery packs located onboard the one or more paving machines 108, the one or more compacting machines 114, and/or other pieces of equipment, respectively. For example, as the one or more paving machines 108, the one or more compacting machines 114, and/or other pieces of equipment operate at the worksite 102, from time to time or on a predetermined schedule, the one or more paving machines 108, the one or more compacting machines 114, and/or other pieces of equipment transmit information associated with their respective batteries. This information is utilized by the control system 116 for determining whether the one or more paving machines 108, the one or more compacting machines 114, and/or other pieces of equipment, respectively, have sufficient power to perform operations at the worksite 102. In FIG. 1, the first paving machine 108(1) is shown having an energy storage device, such as a battery 132, and the first compacting machine 114(1) is shown having an energy storage device, such as battery 134. The first paving machine 108(1) and the first compacting machine 114(1) transmit the battery data 136 (or data associated with energy storage devices) associated with the battery 132 and the battery 134, for use by the control system 116 when determining whether the first paving machine 108(1) and the first compacting machine 114(1) have sufficient power to complete tasks as the worksite 102.

In some instances, the ticketing data 130 and/or the worksite data 128 are used to determine an amount of paving material to be deposited at the worksite 102, and the control system 116 determines whether the batteries of the one or more paving machines 108, the one or more compacting machines 114, and/or other pieces of equipment include sufficient power to perform their intended functions. That is, the control system 116 uses the ticketing data 130 and/or the worksite data 128 to determine the amount of material being supplied to the worksite 102, as well as the operating parameter(s) of the one or more paving machines 108, the one or more compacting machines 114, and/or other pieces of equipment, respectively. In turn, the control system 116 determines whether the one or more paving machines 108, the one or more compacting machines 114, and/or other pieces of equipment have sufficient power to process the paving material. The battery data 136 may be stored in association with the one or more paving machines 108, the one or more compacting machines 114, and/or other pieces of equipment in the equipment registry 126.

In some instances, if the one or more paving machines 108, the one or more compacting machines 114, and/or other pieces of equipment include sufficient power, the control system 116 causes paving material to be supplied to the worksite 102. For example, the control system 116 may transmit a request to the paving material plant 104 associated with supplying paving material. In other words, if the one or more paving machines 108, the one or more compacting machines 114, and/or other pieces of equipment include sufficient power, a flow of operations may not be interrupted (in instances where additional paving material is needed to complete tasks at the worksite).

Alternatively, if the one or more paving machines 108, the one or more compacting machines 114, and/or other pieces of equipment do not include a sufficient amount of power, then the control system 116 determines one or more action(s) to be performed for reducing delay at the worksite 102 and/or preventing mat defects within the mat 112. For example, if the one or more paving machines 108, the one or more compacting machines 114, and/or other pieces of equipment do not include sufficient power stored in their respective batteries, the control system 116 may transmit a request to the paving material plant 104 to refrain from supplying additional paving material, to supply a lesser amount (e.g., tonnage), or to wait to supply additional paving material (e.g., delay supply of the paving material). In instances where the paving material is delayed, upon the pieces of equipment being recharged, for example, the operations at the worksite 102 may resume to normal. The control system 116 may additionally or alternatively utilize other pieces of equipment at the worksite 102.

As an example, the worksite 102 may include additional paving machines and/or additional compacting machines. For example, if the first paving machine 108(1) does not include sufficient power to complete tasks at the worksite 102, a second paving machine 108(2) may be used instead. Likewise, if the first compacting machine 114(1) does not include sufficient power to complete tasks at the worksite 102, a second compacting machine 114(2) may be used instead. In this manner, additional pieces of equipment at the worksite 102 are dispatched or commissioned when other pieces of equipment at the worksite 102 do not include sufficient power to perform their intended operation(s). In such instances, the control system 116 receives the battery data 136 from the second paving machine 108(2), the second compacting machine 114(2), as well as other pieces of equipment at the worksite 102 to know their respective state of charge and/or battery power for determining their ability to complete the tasks.

In some instances, the control system 116 dispatches a recharging vehicle 138 (e.g., truck) that has one or more onboard batteries, generator(s), and the like for recharging the batteries of the one or more paving machines 108, the one or more compacting machines 114, and/or other pieces of equipment. The worksite 102 may also include a recharging station at which the pieces of equipment recharge. Examples of recharging a vehicle is discussed in, for example, U.S. patent Application Ser. No. 16/505,115.

As also discussed herein in relation to FIG. 2, the control system 116 uses historical information associated with previous power usages of the one or more paving machines 108, the one or more compacting machines 114, and/or other pieces of equipment to determine whether the one or more paving machines 108, the one or more compacting machines 114, and/or other pieces of equipment have sufficient power. For example, knowing a current power demand of the one or more paving machines 108, the one or more compacting machines 114, and/or other pieces of equipment at a particular instance in time, the control system 116 determines whether the one or more paving machines 108, the one or more compacting machines 114, and/or other pieces of equipment are capable of handling additional paving material. In such instances, the control system 116 compares a predicted power demand to process the additional paving material to a threshold for determining whether the one or more paving machines 108, the one or more compacting machines 114, and/or other pieces of equipment are capable of performing their respective operations at the worksite 102.

As used herein, the term "controller" is meant in its broadest sense to include one or more controllers, processors, central processing units, and/or microprocessors that are associated with the paving system 100, and that may cooperate in controlling various functions and operations of the paving material plant 104 and the pieces of equipment of the paving system 100. The functionality of the system controller 124 may be implemented in hardware and/or software without regard to the functionality. The system controller 124 may rely on one or more data maps, look-up tables, neural networks, algorithms, machine learning algorithms, data layers, predictive layers, and/or other components relating to the operating conditions and the operating environment of the paving system 100 that are stored in the memory of the system controller 124. Each of the data maps noted above may include a collection of data in the form of tables, graphs, and/or equations to maximize the performance and efficiency of the paving system 100 and its operation.

With continued reference to FIG. 1, the paving material plant 104 includes various material delivery components, mixers, heaters, and/or other equipment configured to assist in manufacturing paving material for use in various paving operations. Such equipment includes, for example, one or more conveyors or other devices configured to transport paving material to one or more paving material silos 140 or other holding locations for storage therein. The paving material plant 104 also includes one or more load stations 142 configured to transfer paving material from the one or more paving material silos 140 to the one or more haul trucks 106. Similarly, the one or more load stations 142 include one or more sensors 144 configured to determine the presence and/or location of one or more haul trucks 106, a time at which the one or more haul trucks 106 arrived at the one or more load stations 142, a time at which the one or more haul trucks 106 departed the one or more load stations 142, an amount (e.g., a weight) of paving material loaded into the one or more haul trucks 106, and/or other information associated with the one or more haul trucks. In some examples, the sensor represents a scale or other mass sensor configured to determine the weight of the one or more haul trucks 106 upon entering the one or more load stations 142, the weight of the one or more haul trucks 106 after paving material has been loaded into the one or more haul trucks 106, and/or a change in weight of the one or more haul trucks 106.

The paving material plant 104 also includes one or more scale houses, operator stations, or other stations 146 for use by paving material plant personnel. For example, as shown in FIG. 1, one or more such stations 146 includes a paving material plant controller 148. In some examples, the paving material plant controller 148 comprises a component of the control system 116. In any of the examples described herein, the paving material plant controller 148 and/or other components of the paving material plant 104 are configured to monitor, record, and/or communicate activities of the various haul trucks 106 entering and leaving the paving material plant 104. For example, the various sensors of the paving material plant 104 and/or the paving material plant controller 148 monitor, sense, determine, record, and/or transmit information indicative of a project associated with particular haul trucks 106, a time at which the particular haul truck 106 enters the paving material plant 104, a time at which the particular haul truck 106 leaves the paving material plant 104, the amount of paving material loaded into the particular haul truck 106, the destination of the particular haul truck 106 (e.g., the location of the worksite 102) the operator of the particular haul truck 106, and/or other information. Such information is used by, for example, the system controller 124 in any of the state determinations, location determinations, and/or other operations described herein. In additional examples, the system controller 124 is configured to communicate with the paving material plant controller 148 for requesting paving material, requesting a termination of paving material, requesting characteristics of the paving material (e.g., amount of oil, aggregate size, temperature, etc.), and the like.

Although FIG. 1 illustrates a single worksite, the paving system 100 may further include one or more other worksites and/or paving material plants (not pictured) than the worksite 102 and the paving material plant 104. In some examples, the one or more haul trucks 106 travel between different ones of the multiple worksites and/or paving material plants along travel paths.

As used herein, a processor, such as the processor(s) 120 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 122 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 120.

The paving system 100 therefore includes components for monitoring a battery power of various pieces of equipment at the worksite 102. The battery power may be compared against threshold(s) to determine whether the batteries have a sufficient amount of power. Such determination, for example, may be based on a prediction production rate of the pieces of equipment and/or a state of the batteries, as well as historical information indication the amount of power required to perform certain operation(s) at the worksite 102.

FIG. 2 illustrates selective components of the paving system 100, such as the control system 116, a paving machine 108 (e.g., the first paving machine 108(1) and/or the second paving machine 108(2)), and a compacting machine 114 (e.g., such as the first compacting machine 114(1) and/or the second compacting machine 114(2)).

As discussed above, an example control system 116 includes one or more of the processor(s) 120, the memory 122, and the system controller 124. The memory 122 stores or has access to the equipment registry 126, which stores information associated with the pieces of equipment at the worksite 102, such as a type, capabilities, make, model, and the like. Such information is used by the system controller 124 when communicating with the pieces of the equipment and/or otherwise identifying the pieces of equipment (e.g., the paving machine 108, the compacting machine 114, etc.). The worksite data 128, meanwhile, corresponds to information associated with the worksite 102, such as location, type of operations being performed at the worksite 102 (e.g., paving, excavation, etc.), and the like. In some instances, the worksite data 128 indicates the operations to be performed by the pieces of equipment at the worksite 102, and operating parameter(s) associated therewith. For example, the worksite data 128 may indicate whether the paving machine 108 is paving, current operating parameters of the paving machine 108 (e.g., depth of the mat 112, width of the mat 112, length of the mat 112, etc.). Such information may, additionally or alternatively, be stored in the equipment registry 126 and associated with respective pieces of equipment. The worksite data 128 may also include information associated with the loads of paving material being supplied to the worksite 102, the loads of paving material in transmit to the worksite 102 (including weight), a route and/or time of travel associated with the loads of paving material supplied to the worksite 102, and so forth. As such, the worksite data 128 is utilized to understand current operations being conducted at the worksite 102.

The ticketing data 130 includes any information associated with one or more loads of paving material supplied by the paving material plant 104. In some examples, an entity operating the paving material plant 104 generates the ticketing data 130 and transmits the ticketing data 130 to the control system 116. By way of non-limiting examples, the ticketing data 130 may include one or more of the following information: a ticket number, a time stamp, identification of the paving material plant 104, identification of the haul truck 106 that received the load of paving material, a project identifier associated with the paving operation to which the load of paving material is to be delivered, a customer identifier associated with the entity operating the haul truck 106, a material identifier for identifying the load of material, a weight indicator indicating the weight of the load of paving material, a project name associated with the paving operation, a material name associated with the paving material, a customer name associated with the entity operating the haul truck 106 that received the load of paving material, a status associated with the entity operating the haul truck 106, a creation time (e.g., a date and time) associated with the load of paving material being received by the haul truck 106, a total weight indication associated with the combined weight of the load of paving material and the haul truck 106, and a running total associated with the amount of paving material provided for the paving operation.

Introduced above, and as discussed below in more detail, the control system 116 receives the battery data 136 for the various pieces of equipment operating at the worksite 102 (e.g., the paving machine 108, the compacting machine 114, etc.). The battery data 136 may be received on a continuous basis, according to a predetermined schedule (e.g., every second, every minute, etc.), and/or based on one or more events (e.g., power on, power off, begin paving, change in operating parameter(s), new load of paving material, receiving the ticketing data 130, etc.). In some instances, the battery data 136 is received directly from the pieces of equipment and/or via one or more intermediary devices. The battery data 136 corresponds to information associated with battery (or batteries) located onboard the pieces of equipment, such as a current state of charge (e.g., percentage, level, etc.), a remaining amount of charge, an amount of electric potential available in the battery (Volts), an amount of power available in the battery (e.g., kilowatts (kW)), and the like. In some instances, the battery data 136 represents a current usage or level of the battery, such as a current amount of power being drawn by the battery (based on the piece equipment performing certain operations).

The control system 116 is configured to determine production rate(s) 200 for the pieces of equipment, respectively. For example, the control system 116 determines the production rate(s) 200 for the paving machine 108 that corresponds to an average rate of distribution of the paving material at the worksite 102. In some instances, the control system 116 utilizes the worksite data 128 to determine the production rate(s) 200 for a particular piece of equipment. Continuing with the above example, the control system 116 uses the worksite data 128 to understand operating parameters of the paving machine 108, such as a depth of the mat 112, a length of the mat 112 (or a length of section in which the paving machine 108 is depositing the paving material), a width of the mat 112, and so forth. Using this information, the control system 116 determines an amount of paving material (e.g., production rate) that the paving machine 108 is depositing over time (e.g., per hour, minute, etc.). In other words, the paving machine 108 may use a certain amount of paving material per hour. Moreover, in combination with the battery data 136, the control system 116 is able to determine a power demand that is associated with the production rate(s) 200. As such, a certain power amount is required for certain production rates(s) 200. Such determinations may be made based on the historical data 202 and using the operating parameter(s) of the paving machine 108. Such operating parameter(s) are compared against similar operating parameter(s) in the historical data 202 to determine the amount of power required for the production rate(s) 200. That is, for past paving operations, for example, an amount of power required by the paving machine 108 under a given set of operating parameter(s) may be determined. Moreover, the production rate(s) 200 for other pieces of equipment are determined. The compacting machine 114, for example, includes production rate(s) 200 associated with the speed, vibrational frequency, vibrational amplitude, and so forth for compacting the paving material.

In some instances, the production rate(s) 200 are forecasted to determine, for future instances, an amount of power required to process the paving material. Here, for example, the control system 116 determines or otherwise knows a number of the haul trucks 106 in transit to the worksite 102, an amount of paving material disposed within the haul trucks 106, an amount of time it takes for the haul trucks 106 to arrive at the worksite 102, and so forth. Such information is used in addition to the operating parameter(s) to determine a current production rate(s) of the pieces of equipment, and the predicted production rate for the pieces of equipment, respectively. That is, the control system 116 has insight into the current production rate(s) (based on what the pieces of equipment are currently doing at the worksite 102 and information, such as settings, of those pieces of equipment), as well as the predicted production rate(s) 200 (based on loads in transmit to the worksite 102). Examples of determining characteristic(s) associated with pieces of equipment, as well as production rate(s), are discussed in, for example, U.S. patent application Ser. No. 17/366,656.

In some instances, the control system 116 utilizes historical data 202 for use in determining the production rate(s) 200. The historical data 202 is used to associate operating parameter(s) of the pieces of equipment, characteristic(s) of the paving material, and so forth to determine the current or predicted production rates. For example, if the paving machine 108 is producing a mat 112 with a certain thickness, length, and width, the control system 116 accesses the historical data 202 to correlate the characteristics of the mat 112 with a certain production rate(s) 200. Moreover, the historical data 202 indicates an associated power demand for the production rate(s) 200. The historical data 202 may also indicate other operating parameter(s) of the pieces of equipment (e.g., speed, make, model, etc.) and/or other characteristics of the paving material (e.g., temperature, aggregate size, etc.) and/or the worksite 102 (e.g., temperature, location, etc.) for use in determining the production rate(s) 200 and/or the power demand required for the production rate(s) 200. In some instances, the historical data 202 indicates an average paving rate associated with the average rate of distribution of the paving material, a graph graphically showing the amount of paving completed versus the projected amount of paving remaining to complete the paving operation. As such, the historical data 202 is used to determine, for given production rate(s) 200, a certain level of power for the paving machine 108 is demanded.

The control system 116 determines the production rate(s) 200 for the respective pieces of equipment at the worksite 102. For example, the control system 116 determines a current production rate of the compacting machine 114 to compact the paving material deposited by the paving machine 108. The control system 116 also determines a predicted production rate of the compacting machine 114 to compact paving material that is in transmit to the worksite 102, but which has not been deposited by the paving machine 108. Here, the control system 116 utilizes the historical data 202 for determining the current production rate and the predicted production rate of the compacting machine 114, as well as an amount of power required to perform the operations at the worksite 102. Such production rate(s) 200 are determined by information associated with the current operating parameter(s) of the compacting machine (e.g., vibrational frequency, vibrational amplitude, speed, etc.), characteristic(s) of the worksite (e.g., temperature), characteristics of the compacting machine (e.g., weight, drum width, etc.), and so forth. The control system 116 similarly determine the production rate(s) 200 for other pieces of equipment at the worksite 102, such as sweepers, milling machines, and so forth.

Using the battery data 136 and the production rate(s) 200, the control system 116 determines whether the pieces of equipment have a sufficient amount of power to perform task(s) at the worksite 102. For example, the control system 116 determines whether the paving machine 108 has sufficient power to deposit the paving material, according to characteristics of the mat 112 (e.g., depth, length, width), whether the compacting machine 114 has sufficient power to compact the mat 112, and so forth. Whether the paving machine 108 and the compacting machine 114 have sufficient power to complete their respective task(s) may be based on a comparison of an amount of charge or power within the batteries (e.g., via the battery data 136) to a threshold. That is, the amount of power within the batteries is compared against a threshold battery power associated with the production rate(s) 200. For each piece of equipment at the worksite 102 this process repeats to determine whether the pieces of equipment have sufficient power for the production rate(s), respectively.

In instances where the pieces of equipment have a sufficient amount of power, the control system 116 determines that the pieces of equipment are capable of handling the production rate(s) 200. In other words, the control system 116 determines to not interrupt the paving operation at the worksite 102 given that the pieces of equipment have sufficient power for completing their respective task(s). Such process may additionally include instructing additional loads of paving material to be supplied to the worksite 102. In the alternative, if the pieces of equipment do not include sufficient power to perform their respective task(s), the control system 116 determines one or more action(s) 204 to be performed. In some instances, the one or more action(s) 204 are determined if one of the pieces of equipment has insufficient power to perform its respective tasks. In this sense, for the paving operation to operate continuously and produce a mat free of defects (or with minimal defects), each piece of equipment needs to have a sufficient amount of power. As such, causing the one or more action(s) 204 to be performed is responsive to any of the pieces of equipment having an insufficient amount of power to process the production rate(s) 200.

The one or more action(s) 204 include actions, instructions, or commands that when performed, serve to limit defects in the mat 112. In some instances, the one or more action(s) include adjusting an amount of paving material supplied to the worksite 102, whether an increase or a decrease, dispatching additional pieces of electronic equipment (e.g., additional paving machines, additional compacting machines, recharging trucks), delaying a supply of paving material, recharging pieces of equipment, and so forth. For example, if the paving machine 108 includes an insufficient amount of power to distribute the paving material at the production rate(s) 200, the control system 116 may dispatch an additional paving machine to distribute the paving material instead. Here, the additional paving machine (e.g., the second paving machine 108(2)) may take the place of the paving machine. In such instances, the control system 116 determines a time and/or a location at which the additional paving machine is to replace the paving machine 108. In another instance, a recharging vehicle is dispatched to recharge the paving machine 108. As a result, the one or more action(s) 204 serve to limit disturbances at the worksite 102, defects in the mat 112, a waste of paving material, cooling of the paving material, and so forth.

In instances where the control system 116 determines that the pieces of equipment have sufficient and/or insufficient amounts of power, the control system 116 causes one or more notification(s) 206 to be output. The notification(s) 206, in some instances, are output on device(s), user interface(s), and the like on the pieces of equipment. For example, a notification may be output that indicates that the paving machine 108 has insufficient power to handle the production rate(s) 200, that the paving machine 108 is to be replaced with an additional paving machine, and so forth. In instances where the control system 116 determines to adjust an amount of paving material being supplied to the worksite, a corresponding notification is sent to the paving material plant 104 indicating that no additional, or a decreased amount of, paving material is to be supplied to the worksite 102.

In some instances, the control system utilizes route data associated with the one or more haul trucks 106 for determining when the one or more haul trucks 106 are predicted to arrive at the worksite 102. Monitoring the location of the one or more haul trucks 106 in this manner permits the control system 116 to determine the predicted production rate(s) based on the amount of load(s) of paving material in transmit to the worksite 102. Moreover, the control system 116 is able to determine when the one or more haul trucks will arrive at the worksite 102 for purposes of dispatching additional haul trucks 106. Examples of determining routes of vehicles, and/or an estimated time of arrival, is described in, for example, U.S. patent application Ser. No. 16/831,570, filed Mar. 26, 2020, the entirety of which is herein incorporated by reference. Additionally, examples of dispatching haul trucks to achieve an optimal supply of paving material is described in, for example, U.S. patent application Ser. No. 16/274,449, filed Feb. 13, 2019.

With further reference to FIG. 2, the paving machine 108 and the compacting machine 114 are further shown including respective components. The paving machine 108, for example, is shown including power electronics 208, including the battery 132 (or one or more batteries), an interface 210, battery data 212, operating parameter(s) 214, and a controller 216. In some instances, the controller 216 is configured to generate the battery data 212 and transmit the battery data 212 to the control system 116. In response, the control system 116 stores the battery data 212 as the battery data 136, in association with the paving machine 108.

The power electronics 208 include circuits that receive and use the energy from the battery 132. For example, the power electronics 208 include electrical terminals connectable to electrical cables, or other hardware, to receive the energy output by the battery 132. The power electronics 208 also convert the energy received from the battery 132, and/or use the energy to power one or more elements of the paving machine 108. For example, power system(s) of the paving machine 108 use energy from the battery 132 to power one or more electric motors of the paving machine 108, electronic control units or other computing systems that at least partially control operations of the paving machine 108 or individual components of the paving machine 108, the interface 210 of the paving machine 108, lights of the paving machine 108, and/or any other electronic or electrical elements of the paving machine 108.

In some examples, the battery 132 and the power electronics 208 have at least one battery data interface that sends and/or receives the battery data 212 and other communications. Such battery data 212 or other communications may be transmitted, via the battery data interfaces, using a Modbus communication protocol or another communication protocol. However, in some instances, the controller 216, for example, is configured to receive and process the battery data 212.

The power electronics 208, the battery 132, and/or the controller 216 transmits the battery data that indicates diagnostic information about the battery 132, status information about the battery 132, alerts indicating faults associated with the battery 132, and/or any other information about the battery 132. For example, as introduced above, the battery data 212 may indicate a current charge state of the battery 132, a maximum charge level of the battery 132, a discharge rate of the battery 132, a voltage level associated with the battery 132, a current charge of the battery 132, a temperature of the battery 132, one or more battery health parameters associated with the battery 132, and/or any other metrics or types of information associated with the battery 132.

The power electronics 208 include one or more power conversion systems, bi-directional power systems, and/or other power systems. For example, the power electronics 208 may include a DC-to-DC converter and a DC-to-AC inverter. The DC-to-DC converter is configured to convert direct current (DC) received from the battery 132 from one voltage level to another voltage level. The DC-to-AC inverter is configured to convert DC to alternating current (AC) that powers other electrical components of the paving machine 108. Accordingly, the DC-to-DC converter may convert DC received from the battery 132 to a voltage level that is compatible with the DC-to-AC inverter.

The controller 216 is configured to interpret and use the battery data 212 associated with the battery 132. The controller 216, for example, processes and/or configures the power system(s) to operate based on, the battery data 212 associated with the battery 132. For example, the control system 116 may cause the power electronics 208 to monitor the battery 132 based on the battery data 212, configure one or more elements based on the battery data 212, display the battery data 212 and/or information derived from the battery data 212 in the interface 210, and/or otherwise operate based at least in part on the battery data 212.

The interface 210 corresponds to a display, screen, and the like for presenting the one or more notification(s) 206. For example, the controller 216 causes the one or more notification(s) 206 to be displayed on the interface 210 for displaying to an operator of the paving machine 108. In some examples, the interface 210 displays the battery data 212 on the interface 210. For example, the interface 210 allows the operator of the paving machine 108 to view information associated with the battery 132 based on the battery data 212, such as diagnostic information, status information, battery alerts, and/or any other type of information.

The controller 214 has access to or generates operating parameter(s) 214 associated with the paving machine 108. The operating parameter(s) 214 indicate operating condition(s) of the paving machine 108 or parameter(s) to which the paving machine 108 is operating. Examples of the operating parameter(s) 214 include speed, characteristics of the paving machine 108 (e.g., depth of mat 112, height of mat 112, length of mat 112, etc.), temperature, location, and the like. The operating parameter(s) 214 may also indicate a current state, or power draw, of the paving machine 108. The controller 216, or the control system 116, is configured to utilize the operating parameter(s) 214 stored within the worksite data 128 for associating the operating parameter(s) 214 with the production rate(s) 200. This enables the control system 116 to manage the worksite 102, the flow of paving material supplied to the worksite 102, and so forth. For example, the control system 116 determines, based at least in part on the operating parameter(s) 214, whether the paving machine 108 has sufficient power for depositing the paving material at the production rate(s) 200.

The compacting machine 114, similar to the paving machine 108, includes power electronics 218, including the battery 134 (or one or more batteries), an interface 220, battery data 222, operating parameter(s) 224, and a controller 226. In some instances, the controller 226 is configured to generate the battery data 222 and transmit the battery data 222 to the control system 116. In response, the control system 116 may store the battery data 222 as the battery data 136.

The power electronics 218 include circuits that receive and use the energy from the battery 134. For example, the power electronics 218 include electrical terminals connectable to electrical cables, or other hardware, to receive the energy output by the battery 134. The power electronics 218 also convert the energy received from the battery 134, and/or use the energy to power one or more elements of the compacting machine 114. For example, the power system(s) of the compacting machine 114 use energy from the battery 134 to power one or more electric motors of the compacting machine 114, electronic control units or other computing systems that at least partially control operations of the compacting machine 114 or individual components of the compacting machine 114, the interface 220 of the compacting machine 114, lights of the compacting machine 114, and/or any other electronic or electrical elements of the compacting machine 114.

In some examples, the battery 134 and the power electronics 218 have at least one battery data interface that sends and/or receives the battery data 222 and other communications. Such battery data 222 or other communications may be transmitted, via the battery data interfaces, using a Modbus communication protocol or another communication protocol. However, in some instances, the controller 226, for example, may be configured to receive and process the battery data 222.

The power electronics 218, the battery 134, and/or the controller 226 transmits the battery data 222 that indicates diagnostic information about the battery 134, status information about the battery 134, alerts indicating faults associated with the battery 134, and/or any other information about the battery 134. For example, the battery data 222 may indicate a current charge state of the battery 134, a maximum charge level of the battery 134, a discharge rate of the battery 134, a voltage level associated with the battery 134, a current charge of the battery 134, a temperature of the battery 134, one or more battery health parameters associated with the battery 134, and/or any other metrics or types of information associated with the battery 134.

The power electronics 218 include one or more power systems, bi-directional power systems, and/or other power systems. For instance, the power electronics 218 may include a DC-to-DC converter and a DC-to-AC inverter. The DC-to-DC converter is configured to convert direct current (DC) received from the battery 134 from one voltage level to another voltage level. The DC-to-AC inverter is configured to convert DC to alternating current (AC) that powers other electrical components of the compacting machine 114. Accordingly, the DC-to-DC converter may convert DC received from the battery 134 to a voltage level that is compatible with the DC-to-AC inverter.

The controller 226 is configured to interpret and use the battery data 222 associated with the battery 134. The controller 226, for example, processes and/or configures the compacting machine 114 to operate based on, the battery data 222 associated with the battery 134. For example, the control system 116 may cause the power electronics 218 to monitor the battery 134 based on the battery data 222, configure one or more elements based on battery data 222, display the battery data 222 and/or information derived from the battery data 222 in the interface 220, and/or otherwise operate based at least in part on the battery data 222.

The interface 220 corresponds to a display, screen, and the like for presenting the one or more notification(s) 206. For example, the controller 226 causes the one or more notification(s) 206 to be displayed on the interface 220 for displaying to an operator of the paving machine 108. In some examples, the interface 220 displays the battery data 222 on the interface 220. For example, the interface 220 allows the operator of the compacting machine 114 to view information associated with the battery 134 based on the battery data 222, such as diagnostic information, status information, battery alerts, and/or any other type of information.

The controller 226 may have access to or generate operating parameter(s) 224 associated with the compacting machine 114. The operating parameter(s) 224 indicate operating condition(s) of the compacting machine 114 or parameter(s) to which the compacting machine 114 is operating. Examples of the operating parameter(s) 224 include speed, characteristics of the compacting machine 114 (e.g., vibrational frequency, vibrational amplitude, etc.), temperature, location, and the like. The operating parameter(s) 224 may also indicate a current state, or power draw, of the compacting machine 114. The controller 226, or the control system 116, is configured to utilize the operating parameter(s) 224 for associating the operating parameter(s) 224 with the production rate(s) 200. This enables the control system 116 to manage the worksite 102, the flow of paving material supplied to the worksite 102, and so forth. For example, the control system 116 determines, based at least in part on the operating parameter(s) 224, whether the compacting machine 114 has sufficient power for compacting the paving material at the production rate(s) 200.

The paving machine 108, the compacting machine 114, and/or other pieces of equipment include additional components not shown and/or listed. For example, the paving machine 108, the compacting machine 114, and/or other pieces of equipment may include various sensors (e.g., speed, acceleration, vibration, location, temperature) for determining a state of the paving machine 108, the compacting machine 114, and/or other pieces of equipment, respectively, operations being performed by the paving machine 108, the compacting machine 114, and/or other pieces of equipment, and so forth. The paving machine 108, the compacting machine 114, and/or other pieces of equipment are also configured with network interfaces for communicating over the network 118, and may include other input/output (I/O) devices than discussed.

The battery 132 and/or the battery 134 may represent be a lithium-ion (Li-ion) battery, a lithium-ion polymer battery, a nickel-metal hydride (NiMH) battery, a lead-acid battery, a nickel cadmium (Ni—Cd) battery, a zinc-air battery, a sodium-nickel chloride battery, or any other type of battery. In some examples, the paving machine 108 and/or the compacting machine 114 may include a single battery or multiple batteries (e.g., one or more battery packs that each include one or more individual batteries). In some examples, the battery 132 and/or the battery 134 is capable of holding up to 100 volts (V) of electronic potential.

Although the paving machine 108 and the compacting machine 114 are discussed herein, the control system 116 may communicatively couple to any vehicles, industrial equipment, or any other type of machine that is at least partially powered one or more batteries. In some examples, such machines include a work vehicle, such as a wheel loader, a backhoe, a bulldozer, a tanker, a paver, an excavator, a crusher, a tractor, a farm vehicle, a dump truck, another type of truck, or any other type of vehicle. In other examples, such machines include a vehicle used for personal or commercial transportation, such as an electric automobile or other electric vehicle, a hybrid vehicle, or a fuel-based vehicle that is at least partially powered by one or more batteries. In still other examples, the machine includes a stationary or portable piece of work machinery or other equipment that is at least partially powered by one or more batteries 132, 134.

The control system 116 may further be in communication with one or more device(s) 228, such as one or more tablets, computers, cellular/wireless telephones, personal digital assistants, mobile devices, or other electronic devices located at the worksite 102, at the paving material plant 104, and/or remote from the worksite 102 or the paving material plant 104. Such device(s) 228 include, for example, mobile phones and/or tablets of project managers (e.g., foremen 230) overseeing daily operations at the worksite 102, at the paving material plant 104, and/or in surrounding areas.

FIG. 2 further illustrates that the control system 116 is further in communication with additional pieces of equipment, such as one or more recharging trucks, one or more paving machines, one or more compacting machines, or other pieces of equipment. The control system 116 is configured to receive the battery data 136 from these additional pieces of equipment for knowing a charging status or power level for determining whether the additional pieces of equipment are capable of handling the production rate(s) 200 at the worksite 102. Such information is useful in determining the action(s) to be performed when pieces of equipment at the worksite are unable to perform their intended tasks.

Although the paving machine 108 and the compacting machine 114 are shown and described as having batteries (e.g., the battery 132 and the battery 134, respectively), in some instances, other energy storage devices may be used to power the paving machine 108 and/or the compacting machine 114. For example, the paving machine 108 and/or the compacting machine 114 may have fuel cells. In such instances, the paving machine 108 and/or the compacting machine 114 may transmit data associated with an amount of energy associated with the fuel cell to the control system 116. Therein, the control system 116 may use such data for determining whether the fuel cells have a sufficient amount of energy for performing operations at the worksite 102.

Therefore, as shown in FIG. 2, the control system 116 includes components for monitoring an amount of battery power within the pieces of equipment, as well as a production rate 200 of the pieces of equipment. Such information is utilized for determining whether the pieces of equipment include sufficient battery power for performing operation(s) at the worksite 102. In doing so, the paving operation may be controlled to reduce waste and defects within the mat 112.

FIGS. 3-6 illustrate various processes related to using battery power to control one or more operations associated with a worksite. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

The processes illustrated herein may be performed by any of the processors/controllers described above, but for ease of description, the system controller 124 will be referred to unless otherwise noted.

Figure 3:
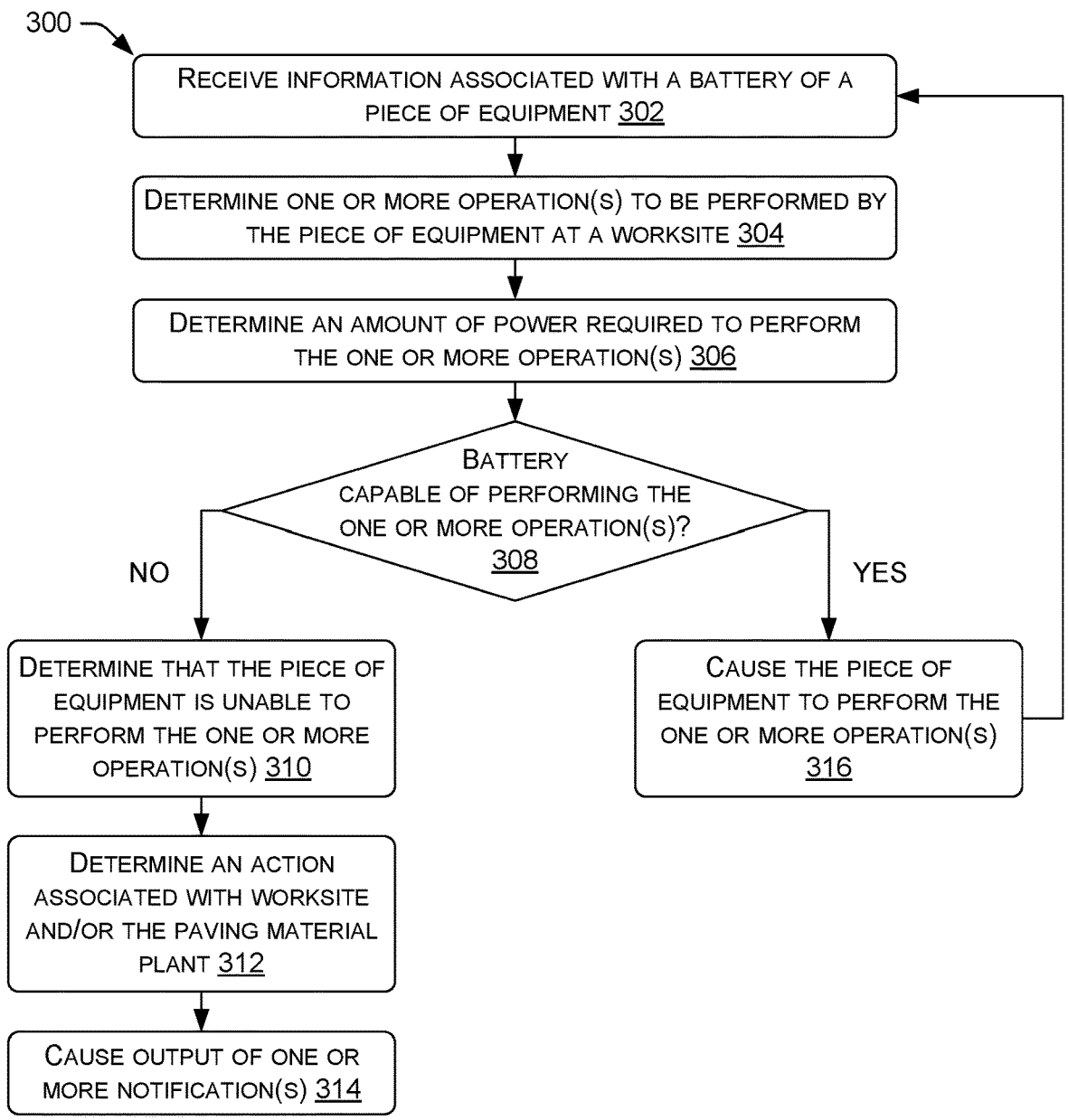
FIG. 3 illustrates an example process for determining whether a piece of equipment has a sufficient amount of power to perform operation(s) at a worksite, according to an embodiment of the present disclosure.

FIG. 3 illustrates an example process 300 for determining whether a piece of equipment (e.g., a paving machine, a compacting machine, etc.) has sufficient power for performing operation(s) at a worksite.

At 302, the system controller 124 may receive information associated with a battery of a piece of equipment. For example, at 302 the system controller 124 receives the battery data 136 from the piece of equipment, where the battery data 136 indicates a level of charge of the battery (e.g., percentage, such as being 50% charged), an amount of power being drawn by the piece of equipment (e.g., kWh), an available amount of power within the battery (e.g., kWh), and so forth. As an example, the battery data 136 may indicate that the piece of equipment has 300 kWh available or that the piece of equipment is using 120 kWh. In some instances, the information associated with the battery may be received on a continual basis, according to a predetermined schedule, according to one or more events at the piece of equipment (e.g., power on), and the like.

At 304, the system controller 124 may determine one or more operation(s) to be performed by the piece of equipment. For example, at 304 the system controller 124 determines an amount of paving material that the piece of equipment is to process (compact, lay, etc.) at the worksite 102. Additionally, the system controller 124 determines characteristic(s), or operating parameter(s), to be performed by the piece of equipment. For example, the system controller 124 receives the operating parameter(s) from the piece of equipment for use in determining specifics of the operations (e.g., depth of mat, length of mat, width of mat, etc.). As an example, the operating parameter(s) may indicate that the piece of equipment is preparing a mat that is three inches thick, twelve feet wide, and one thousand feet long. In some instances, the system controller 124 receives the operating parameter(s) from the piece of equipment for determining the operation(s) and/or accesses information stored in the worksite data 128. Here, the worksite data 128 indicates the operations to be performed by the piece of equipment (as well as other pieces of equipment) at the worksite 102.

At 306, the system controller 124 may determine an amount of power required to perform the one or more operation(s). For example, at 306 the system controller 124 utilizes the historical data 202 to determine the amount of power to perform the operation(s). Such data indicates, for past operation(s), the amount of power required to perform the operation(s) (or like operations). In some instances, the amount of power to perform the operation(s) is filtered based on the operating parameter(s) of the piece of equipment, characteristic(s) of the worksite 102 (e.g., temperature), and so forth. Moreover, the system controller 124 determines the amount of power for the specific piece of equipment (e.g., make, model, type, etc.). For example, continuing with the above example, the system controller 124 may determine, for a piece of equipment preparing a mat that is three inches thick, twelve feet wide, and one thousand feet long, how many kWh is required of the piece of equipment to perform such operations.

In other words, knowing the operation(s) to be performed by the piece of equipment, the system controller 124 determines the amount of power required to perform such operation(s). Such amount of power may also be determined using historical data 202 and/or the operating parameters that indicates how long the piece of equipment takes to deposit the paving material. For example, if the piece of equipment is scheduled to process fifty tons of paving material, and it takes ten minutes to deposit five tons, the system controller 124 determines that the piece of equipment will take 100 minutes to deposit the paving material. To deposit such material, and based on the operating parameters, the system controller 124 determines an amount of power required to process such paving material. For example, to process the fifty tons of paving material, the system controller 124 may determine that approximately 200 kWh are required to deposit the paving material. As indicated, the amount of power is based on the operating parameter(s) of the piece of equipment, condition(s) at the worksite 102, and so forth. Once the amount of power is determined, such value is compared against the amount of power stored in the battery.

At 308, the system controller 124 determines whether the piece of equipment is capable of performing the one or more operation(s). For example, at 308 the system controller 124 compares the amount of power within the battery (from 302) with the amount of power required to perform the one or more operation(s). Such comparison determines whether the piece of equipment, operating at the current conditions, is able to perform the one or more operation(s). Continuing with the above example, if the battery of the piece of equipment has 300 kWh available, and the amount of power required to perform the operations is 200 kWh, and the available amount of power is 300 kWh, the system controller 124 may determine that the piece of equipment has sufficient power to process the paving material. In some instances, the amount of power required to perform the one or more operation(s) represents a minimal, average, or maximum amount of power to perform the one or more operation(s). If the system controller 124, at 308, determines that the battery has insufficient power to perform the one or more operations, the system controller 124 may determine, at 310, that the piece of equipment is unable to perform the one or more operation(s). For example, at 310, the system controller 124 determines that the piece of equipment needs a certain amount of kW to perform the one or more operation(s), and the battery of the piece of equipment has less than the amount of kW to perform the one or more operation(s).

At 312, the system controller 124 may determine an action associated with the worksite 102 and/or the paving material plant 104. For example, at 312, the system controller 124 determines an action, among the action(s) 204, to reduce delay at the worksite 102, reduce defects in the mat 112, reduce paving material being wasted, and so forth. For example, the system controller 124 determines to commission another piece of equipment for taking the place of the piece of equipment having an insufficient amount of power, commission a recharging vehicle to recharge batteries of the piece of equipment, communicate with the paving material plant 104 to halt, delay, and/or reduce supply of the paving material, alter operating parameter(s) of the piece of equipment (e.g., speed), and the like. Such determination may be made using the battery power associated with the additional pieces of equipment, as well as the predicted production rate required of that particular piece of equipment. In some instances, the system controller 124 determines multiple actions, such as commissioning a new piece of equipment and recharging the piece of equipment having insufficient power.

At 314, the system controller 124 may cause output of one or more notification(s) 206. For example, at 314, the system controller 124 outputs the one or more notification(s) 206 that indicate the action to be performed and/or that the piece of equipment has an insufficient amount of power to perform the operation(s). The one or more notification(s) 206 may be output on the piece of equipment, at the paving material plant 104, the one or more device(s) 228, and so forth. In some instances, the notification(s) 206 include visual displays indicating the action 204 to be undertook, warnings associated with the insufficient amount of power, and the like.

Alternatively, if at 308 the system controller 124 determines that the piece of equipment has a sufficient amount of power, the system controller 124 at 316 may cause the piece of equipment to perform the one or more operations. For example, at 316, the system controller 124 instructs the piece of equipment to perform the one or more operation(s) or refraining from interrupting the piece of equipment performing the one or more operation(s). In some instances, a notification of such is output as well.

From 316, the process 300 may loop to 302 whereby the system controller 124 continuously determines whether the piece of equipment has sufficient power to perform operation(s). That is, as the piece of equipment performs the one or more operation(s) according to operating parameter(s), the one or more operation(s) and/or operating parameter(s) change as well. For example, the depth of the mat 112 may change as the piece of equipment traverses about an environment. Here, the updated operating parameter(s) are used to determine whether the piece of equipment has sufficient power to perform the one or more operation(s) (or other operation(s)) based on the new operating parameter(s). Such determinations are also determined via the battery data 136 and/or the historical data 202. Moreover, as additional paving material is supplied to the worksite 102 or determining whether additional paving material should be supplied to the worksite 102, the system controller 124 determines whether the piece of equipment has sufficient power to handling the additional paving material.

Although FIG. 3 and the process 300 illustrates a scenario whereby the system controller 124 determines whether the piece of equipment is capable of performing all of the one or more operation(s), the system controller 124 may determine a portion of the one or more operation(s) that are capable of being performed by the piece of equipment. In such instances, the system controller 124 determines a first portion of the one or more operation(s) to be performed by the piece of equipment, and then a second portion of the one or more operation(s) to be performed by an additional piece of equipment. Here, even though the piece of equipment does not include a sufficient amount of battery power to perform all of the operation(s), the piece of equipment performs some of the operation(s) (per the given amount of power), before the additional piece of equipment is commissioned to perform the remaining operation(s).

Additionally, although the process 300 is described as using data associated with an amount of energy capable of being provided by a battery, the paving machine 108 and/or the compacting machine 114 may include other energy storage devices. For example, the paving machine 108 and/or the compacting machine 114 may have fuel cells. In such instances, the system controller 124 may receive data associated with an amount of energy stored within the fuel cell. Therein, system controller 124 may use such data for determining whether the fuel cells have a sufficient amount of energy for performing operations at the worksite 102.

In some instances, the system controller 124 may determine a factor of safety (FoS) associated with the amount of power required to perform the operation(s) and/or the amount of energy stored with the batteries 132, 134. For example, if the batteries 132, 134 have 200 kWh of energy, the system controller 124 may determine that the batteries 132, 134 have 150 kWh of available energy. In other words, the batteries 132, 134 may not be completed depleted when the pieces of equipment perform the operations. This delta of energy may be used to transport the pieces of equipment off the worksite 102. Additionally, as the operating parameter(s) change at the worksite 102 (e.g., depth of mat changes), the pieces of equipment may draw additional power from the batteries 132, 134, respectively. By factoring in a degree of safety, these varying operating parameter(s) may be accounted for. For example, if the system controller 124 determines that 100 kWh are needed for a piece of equipment, the system controller 124 may have a FoS of 20% and determine if the piece of equipment has 120 kWh of energy available. If so, the system controller 124 determines that the piece of equipment has enough power to complete the operations, but if not, the system controller 124 may determine an action to perform at the worksite 102 and/or the paving material plant 104.

In this regard, the system controller 124 may continuously receive the battery data 136 as well as the operating parameter(s) from the pieces of equipment for continuously determining whether the pieces of equipment have sufficient power to complete the operations. That is, as operating conditions at the worksite change, and additional or less power is drawn, the system controller 124 may continuously determine the updated power required to process the paving material. For example, at a first instance, the piece of equipment may require 100 kWh to process the paving material, but at a second instance, may require 120 kWh. This change in kWh may be used by the system controller 124 to determine whether the piece of equipment is able to process additional paving material in transmit or being supplied by the paving material plant 104.

FIG. 3 therefore illustrates a process 300 by which the system controller 124 determines whether a particular piece of equipment at the worksite 102 has a sufficient amount of power. Such determination reduces defects in the mat 112 at the worksite 102. For example, the system controller 124 receives information associated with the battery of the piece of equipment for making as a decision as to whether the piece of equipment is capable of performing operation(s) to process the paving material, according to the operating parameter(s) of the piece of equipment, characteristic(s) of the worksite 102, and so forth. As such, the system controller 124 determines ahead of time whether the piece of equipment has a sufficient amount of power reduces defects in the mat 112, which reduces an amount of waste at the worksite 102.

Figure 4:
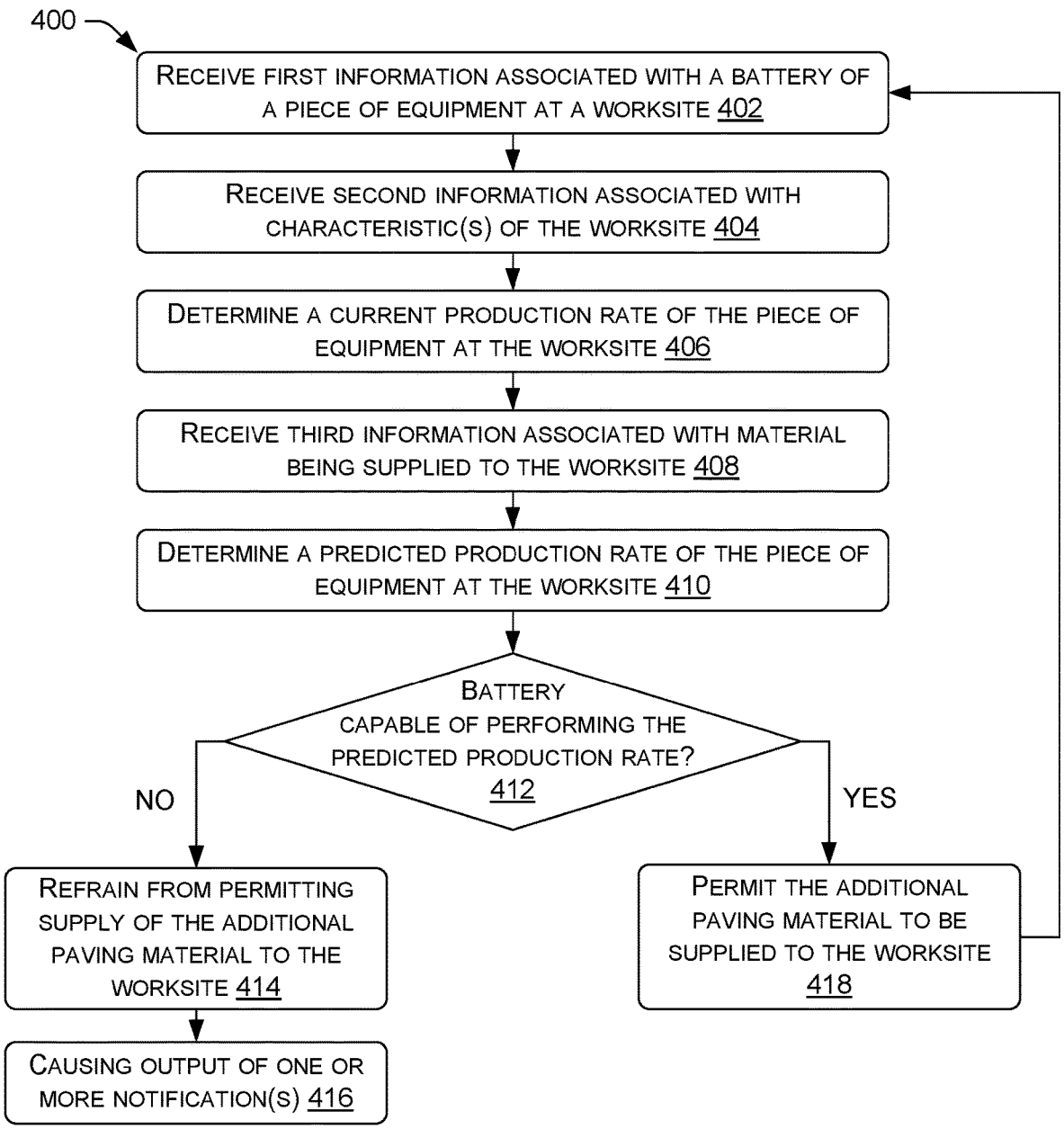
FIG. 4 illustrates an example process for determining whether a piece of equipment has a sufficient amount of power to perform operation(s) at a worksite, according to an embodiment of the present disclosure.

FIG. 4 illustrates an example process 400 for determining whether to supply additional paving material to a worksite 102 based on a production rate 200 of a piece of equipment at the worksite 102.

At 402, the system controller 124 may receive first information associated with a battery of a piece of equipment. For example, at 402, the system controller 124 receives the battery data 136 from the piece of equipment, where the battery data 136 indicates a level of charge of the battery (e.g., percentage), an amount of power being drawn (e.g., kW), an amount of power within the battery, and so forth. In some instances, the information associated with the battery may be received on a continual basis, according to a predetermined schedule, according to one or more events at the piece of equipment, and the like.

At 404, the system controller 124 may receive second information associated with characteristic(s) of the worksite 102. For example, at 404, the system controller 124 receives the operating parameter(s) from the piece of equipment for use in determining specifics of the operations (e.g., depth of mat). In some instances, the system controller 124 receives the operating parameter(s) from the piece of equipment for determining the operation(s) and/or accesses information stored in the worksite data 128. Here, the worksite data 128 indicates the operations to be performed by the piece of equipment (as well as other pieces of equipment) at the worksite 102, as well as characteristic(s) of the worksite 102 (e.g., length of the mat 112).

At 406, the system controller 124 may determine a current production rate of the piece of equipment at the worksite 102. For example, at 406, the system controller 124 determines the current production rate that is associated with an amount of paving material currently being processed by the piece of equipment. In instances where the piece of equipment includes a paving machine, the current production rate corresponds to a tonnage of the paving material being distributed by the paving machine (e.g., per hour, per minute, etc.). In instances where the piece of equipment includes a compacting machine, the current production rate corresponds to a surface area the compacting machine is compacting (e.g., per hour, per minute, etc.). For other pieces of equipment, the production rate is associated with an amount of paving material the piece of equipment is configured to handle, process, or otherwise condition. The production rate may be determined based at least in part on the operating parameter(s).

At 408, the system controller 124 may receive third information associated with material being supplied to the worksite 102. For example, at 408, the system controller 124 receives information of the one or more haul trucks 106 supplying the paving material to the worksite 102. At a given instance, one or more haul trucks 106 may be in transit to the worksite 102, at the worksite 102 and awaiting to deposit the paving material, and so forth. Such information is represented within the ticketing data 130, and the system controller 124 determines, based on the ticketing data 130, the amount of paving material being supplied to the worksite 102. Other characteristic(s) of the paving material may also be determined via the ticketing data 130. However, the system controller 124 utilizes the ticketing data 130 to know the amount of paving material yet to be distributed at the worksite 102.

At 410, the system controller 124 may determine a predicted production rate of the piece of equipment. For example, at 410, the system controller 124 determines the amount of paving material yet to be deposited, and the characteristic(s) of the worksite 102, and then determines the predicted production rate. The predicted production rate represents a prediction (e.g., forecast) as to the amount paving material to be deposited at the worksite 102 and a corresponding amount of power required to process the paving material. Such determination is made using the historical data 202 and correlating the characteristic(s) of the worksite 102 with those stored in the historical data 202. As an example, if the paving machine 108 is to generate a mat 112 with a certain depth, thickness, and length, the system controller 124, using the historical data 202 and the operating parameter(s), determines an amount of power required by the paving machine 108 to lay the mat 112. The amount of power, in some instances, is also based on other characteristic(s) at the worksite 102 (e.g., temperature) and/or other operating parameter(s) of the piece of equipment (e.g., speed). As such, for the predicted production rate(s) 200, the system controller 124 determines an amount of power required.

At 412, the system controller 124 determines whether the battery is capable of performing the predicted production rate. For example, at 412, the system controller 124 determines whether the battery includes enough power to perform the predicted production rate, using the current production rate of the piece of equipment (e.g., current status). For example, using the predicted production rate, the system controller 124 determines an amount of power required for the predicted production rate, and compares the amount of power to a threshold. Such threshold, as noted above, is determined via accessing the historical data 202.

If at 412 the system controller 124 determines that the piece of equipment is incapable of performing the predicted production rate, the system controller 124 may determine at 414, to refrain from permitting supply of additional material to the worksite 102. For example, at 414, the system controller 124 may communicate with the paving material plant 104 to refrain from supplying additional paving material, supply a different amount of paving material, or delay supplying the paving material. That is, being as the piece of equipment does not include sufficient power, the system controller 124 prevents or alters the supply of the paving material to the worksite 102. This may reduce waste at the worksite 102 and/or limit defects in the mat 112. However, in some instances, after the pieces of equipment have been replaced and/or recharged, the system controller 124 may request an additional supply of the paving material to resume the paving operation to normal production rate(s) prior to the switching the pieces of equipment and/or requesting a reduced supply of paving material.

At 416, the system controller 124 may cause output of one or more notification(s) 206. For example, at 416, the system controller 124 outputs the one or more notification(s) 206, which indicate that the piece of equipment has an insufficient amount of power to perform the operation(s). The one or more notification(s) 206 may be output on the piece of equipment, at the paving material plant 104, the one or more device(s) 228, and so forth. In some instances, the notification(s) 206 include visual displays, warnings, and the like.

Alternatively, if at 412 the system controller 124 determines that the piece of equipment is capable of performing at the predicted production rate, the system controller 124 at 418 may permit additional paving material to be supplied to the worksite 102. That is, if the piece of equipment includes sufficient power to handle the current and in-transmit supply of paving material, as well as additional paving material, the system controller 124 permits the additional paving material to be supplied to the worksite 102 (if needed). The system controller 124 communicates with the paving material plant 104 indicating of the ability to accept additional paving material.

From 418, the process 400 may loop to 402 whereby the system controller 124 continuously determines the capability of the piece of equipment to handle the paving material. For example, as the piece of equipment operates according to certain operating parameter(s), the amount of power drawn by the piece of equipment may be different when the operating parameter(s) change. This impacts the predicted production rate of the piece of equipment. In turn, with the new predicted production rate, the system controller 124 determines whether the piece of equipment is capable of handling additional paving material, and/or the paving material in transmit to the worksite 102. In the latter example, if the paving material has already been dispatched, but the predicted production rate changes and the piece of equipment is no longer capable of handling the paving material, that paving material (or the haul truck 106 associated therewith), may be rerouted to an additional worksite or other location.

FIG. 4 and the process 400 therefore illustrates a scenario in which predicted production rate of the piece of equipment is utilized when determine whether additional paving material is supplied to the worksite 102. Such determination, ahead of time, prevents paving material being transmitted to the worksite 102, which reduces waste and/or cooling of the paving material. Moreover, the predicted production rate of the piece of equipment are continuously determined for use updating whether the paving material is to be supplied to the worksite 102.

Figure 5:
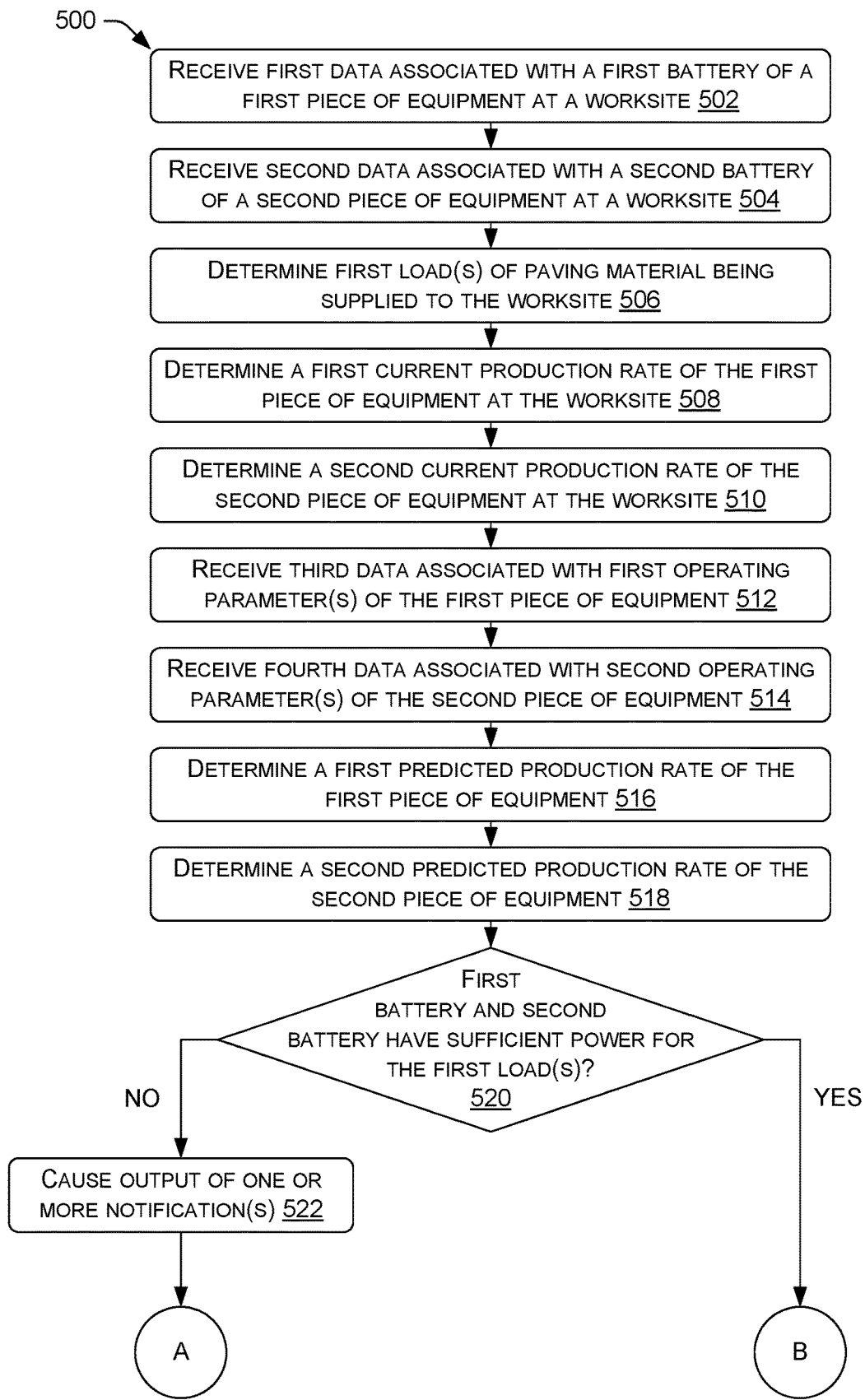
FIGS. 5 and 6 illustrate an example process for determining whether pieces of equipment have a sufficient amount of power to perform operation(s) at a worksite, respectively, according to an embodiment of the present disclosure.
Figure 6:
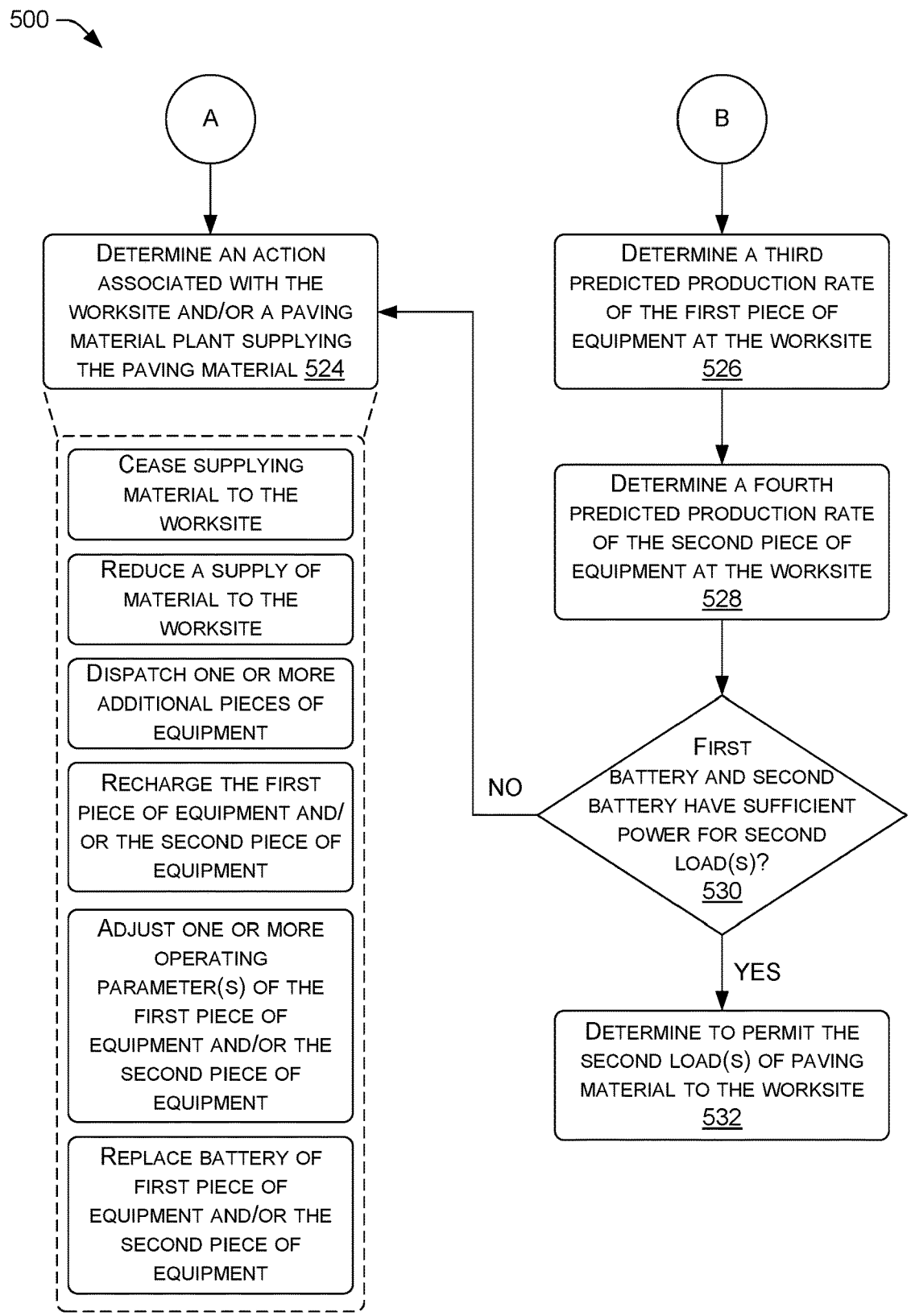

FIGS. 5 and 6 illustrate an example process 500 for determining whether multiple pieces of equipment have sufficient power to perform operation(s) at a worksite 102.

At 502, the system controller 124 may receive first data associated with a first battery of a first piece of equipment. For example, at 502, the system controller 124 receives the battery data 212 from the first piece of equipment, where the battery data 212 indicates a level of charge of the battery 132 (e.g., percentage), an amount of power being drawn (e.g., kW), and so forth. In some instances, the first piece of equipment represents a paving machine.

At 504, the system controller 124 may receive second data associated with a second battery of a second piece of equipment. For example, at 504, the system controller 124 receives the battery data 222 from the second piece of equipment, where the battery data 222 indicates a level of charge of the battery 134 (e.g., percentage), an amount of power being drawn (e.g., kW), and so forth. In some instances, the second piece of equipment represents a compacting machine.

At 506, the system controller 124 may determine first load(s) of paving material being supplied to the worksite 102. For example, at 506, the system controller 124 determines the first load(s) based on receiving the ticketing data 130 from the paving material plant 104. For example, as loads of paving material are produced, the system controller 124 receives information associated with the paving material, such as weight, temperature, oil percentage, aggregate size, and so forth. As such, the system controller 124 determines how much paving material has been produced, how much paving material is in transmit to the worksite 102, and when the paving material will arrive at the worksite 102.

At 508, the system controller 124 may determine a first current production rate of the first piece of equipment. For example, at 508, the system controller 124 determines the first current production rate that is associated with an amount of paving material currently being processed by the first piece of equipment. For example, for the paving machine, the current production rate corresponds to a tonnage of the paving material being distributed by the paving machine (e.g., per hour, per minute, etc.). As such, the first current production rate indicates a how much work the paving machine is currently doing at the worksite 102. In some instances, the first current production rate is associated with the first data to correlate the amount of work with an amount of power being drawn by the first piece of equipment.

At 510, the system controller 124 may determine a second current production rate of the second piece of equipment. For example, at 510, the system controller 124 determines the second current production rate associated with an amount of paving material currently being processed by the second piece of equipment. For example, for the compacting machine the current production rate corresponds to a surface area the compacting machine is compacting (e.g., per hour, per minute, etc.). As such, the second current production rate indicates a how much work the compacting machine is currently doing at the worksite 102. In some instances, the second current production rate is associated with the second data to correlate the amount of work with an amount of power being drawn by the second piece of equipment.

At 512, the system controller 124 may receive third data associated with first operating parameter(s) of the first piece of equipment. For example, at 512, the system controller 124 receives the operating parameter(s) 214 of the first piece of equipment, which corresponds to setting(s) of the paving machine 108. The operating parameter(s) 214 indicate, for example, a depth of the mat 112, a length of the mat 112, a width of the mat 112, a temperature of the mat 112 (the paving material, the surface, etc.), a speed of the paving machine 108, and so forth. The operating parameter(s) 214 are associated with the first current production rate and/or the amount of power being drawn by the paving machine.

At 514, the system controller 124 may receive fourth data associated with second operating parameter(s) of the second piece of equipment. For example, at 514, the system controller 124 receives the operating parameter(s) 224 of the second piece of equipment, which corresponds to setting(s) of the compacting machine 114. The operating parameter(s) 224 indicate, for example, a width of the mat 112, a width of the compacting machine, a vibrational frequency of the compacting machine, a vibration amplitude of the compacting machine, a temperature of the mat 112 (the paving material, the surface, etc.), a speed of the compacting machine, and so forth. The operating parameter(s) 224 are associated with the second current production rate and/or the amount of power being drawn by the compacting machine.

At 516, the system controller 124 may determine a first predicted production rate of the first piece of equipment. For example, at 516, the system controller 124 determines the first predicted production rate based on the first load(s) of paving material being supplied to the worksite 102 and the operating parameter(s) 214 of the paving machine 108. In other words, knowing the amount of paving material being supplied to the worksite 102, and the operating parameter(s) of the paving machine 108, the system controller 124 determines the first predicted production rate. The first predicted production rate may additionally be based at least in part on the first current production rate and/or accessing the historical data 202. For example, knowing the amount of paving material being supplied and the operating parameter(s) of the paving machine, the system controller 124 accesses the historical data 202 to determine the first predicted production rate.

Moreover, in association with the first predicted production rate, the system controller 124 determines an amount of power required for the first predicted production rate. Such determination may be based on the first current production rate and the amount of power being drawn from the first battery for the first current production rate. The system controller 124 may also access the historical data 202 to determine the amount of power required for the first predicted production rate.

At 518, the system controller 124 may determine a second predicted production rate of the second piece of equipment. For example, at 518, the system controller 124 determines the second predicted production rate based on the first load(s) of paving material being supplied to the worksite 102 and the operating parameter(s) 224 of the compacting machine. In other words, knowing the amount of paving material being supplied to the worksite 102, and the operating parameter(s) of the compacting machine, the system controller 124 determines the second predicted production rate. The second predicted production rate may additionally be based at least in part on the second current production rate and/or by accessing the historical data 202. For example, knowing the amount of paving material being supplied and the operating parameter(s) of the compacting machine, the system controller 124 may access the historical data 202 to determine the second predicted production rate. Additionally, in association with the second predicted production rate, the system controller 124 determines an amount of power required for the second predicted production rate. Such determination may be based on the second current production rate and the amount of power being drawn from the second battery for the second current production rate. The system controller 124 may also access the historical data 202 to determine the amount of power required for the second predicted production rate.

At 520, the system controller 124 may determine whether the first battery and the second battery have sufficient power for the first load(s). For example, at 520, the system controller 124 compares an amount of power stored with the first battery against the first amount of power associated with the first predicted production rate, and compares an amount of power stored with the second battery against the second amount of power associated with the second predicted production rate. Such comparison determines whether the paving machine has enough power to process the paving material within the first load(s), and whether the compacting machine has enough power to process the paving material within the first load(s).

If at 520, the system controller 124 determines that either the first battery or the second battery have an insufficient amount of power for the first load(s), the system controller 124 may at 522, cause output of one or more notification(s) 206. For example, the system controller 124 outputs one or more notification(s) that the first battery or the second battery have insufficient power for the first load(s). Such notification(s) 206 may be output on the paving machine, the compacting machine, or other device(s). From 522, the process 500 may continue to "A" which is discussed in relation to FIG. 6.

From "A" the system controller 124 at 524 determines an action associated with the worksite 102 and/or the paving material plant 104 supplying the paving material. For example, if the first battery and/or the second battery do not have sufficient power to process the paving material in the first load(s), the system controller 124 determines an action 204 associated with preventing defects in the mat 112 (e.g., via cooling of the paving material) and/or preventing a waste of paving material (e.g., supplying additional loads to the worksite 102).

FIG. 6 illustrates example actions that may be performed. For example, the action 204 may include ceasing (or delaying) supply of the paving material to the worksite 102. In an effort to reduce waste of paving material being supplied to the worksite 102 that the paving machine and/or the compacting machine do not include enough power to process, the system controller 124 may transmit a request to the paving material plant 104 to cease supply of the paving material. This may prevent the haul trucks 106 being routed to the worksite and/or an accumulation of the haul trucks 106 at the worksite 102. The action 204 may alternatively include reducing a supply of the paving material to the worksite 102. Here, the paving material plant 104 may supply a lessened amount of the paving material that the paving machine and/or the compacting machine can process with their respective batteries. The action 204 may also include dispatching one or more additional pieces of equipment, such as another paving machine and/or another compacting machine. These additional pieces of equipment may replace the first piece of equipment or the second piece of equipment at the worksite, and include sufficient power for processing the first load(s). In some instances, the system controller 124 communicates with the additional pieces of equipment, or accesses the equipment registry 126, for determining the amount of power within the additional pieces of equipment before making a determination about which pieces of equipment to dispatch. The action 204 may also include dispatching a charging vehicle to recharge the first battery of the paving machine and/or the second battery of the compacting machine. In some instances, rather than recharging the batteries, the batteries may be interchanged with one or more batteries that are already charged. The action 204 may also include, in some instances, adjusting one or more operating parameter(s) of the first piece of equipment and/or the second piece of equipment. For example, the system controller 124 may determine to reduce a speed of the paving machine such that the paving machine draws less power from the first battery. Such adjustment may enable the paving machine to handle the first loads, and/or process the paving material until one or more additional pieces of equipment arrive at the worksite and/or replace the paving machine or the compacting machine 114. In some instances, the action 204 may be determined based on an impact the paving operation. For example, the action 204 that is least impactful to the paving operation, or results in the least amount of delay at the worksite 102, may be selected.

If at 520 determines that the first battery or the second battery have sufficient power for the first load(s), the process 500 may continue to "B" which is discussed in relation to FIG. 6. From "B" the system controller 124 at 526 determines a third predicted production rate of the first piece of equipment at the worksite 102. The system controller 124 determines the third predicted production rate based on the ticketing data 130 (whether the same or additional ticketing data 130 from 506) and/or operating parameter(s) of the paving machine 108. For example, it is envisioned that the production rate of the paving machine vary as condition(s) at the worksite 102 vary. Such condition(s) impact the operating parameter(s) of the paving machine, and thus, the production rate and/or the amount of power being drawn by the paving machine. Thus, by continuously monitoring the operating parameter(s) of the paving machine, the system controller 124 determines a predicted production rate for the paving machine to process loads.

At 528, the system controller 124 determines the fourth predicted production rate based on the ticketing data 130 (whether the same or additional ticketing data 130 from 506) and/or operating parameter(s) of the compacting machine. For example, it is envisioned that the production rate of the compacting machine vary as condition(s) at the worksite 102 vary. Such condition(s) impact the operating parameter(s) of the compacting machine, and thus, the production rate and/or the amount of power being drawn by the compacting machine.

At 530, the system controller 124 determines whether the first battery and the second battery have sufficient power for second load(s). For example, the system controller 124 compares an amount of power stored with the first battery against the first amount of power associated with the third predicted production rate, and compares an amount of power stored with the second battery against the amount of power associated with the fourth predicted production rate. In other words, as the operating parameter(s) of the pieces of equipment change and the pieces of equipment process the paving material, the system controller 124 determines the capability of the pieces of equipment to process additional loads of paving material. If at 530 the system controller 124 determines that the first battery or the second battery have insufficient power to handle additional loads (e.g., the first battery or the second battery only have sufficient power to handle the first load(s)), the system controller 124 determines the one or more action(s) at 524. However, if the system controller 124 determines that the first battery and the second battery have sufficient power to handle second load(s), the system controller 124 determines at 532, to permit second load(s) of paving material to the worksite.

For example, the system controller 124 may communicate with the paving material plant 104 to continue the supply of the paving material. In these instances, because the first piece of equipment and the second piece of equipment can process the paving material in the first load(s), the system controller 124 determines to supply second load(s) of paving material to the worksite 102. Such determination provides a continuous supply of paving material to the worksite to prevent defects in the mat 112 and/or delay in paving material at the worksite 102.

FIGS. 5 and 6 therefore illustrate a process by which the system controller 124 may continuously determine whether pieces of equipment have sufficient battery power to process loads of paving material. By making this determination, the system controller 124 determines whether to supply additional loads of paving material, or performing actions for reducing a likelihood of defects with the mat 112. For example, a quality of the mat 112 is maximized when the paving machine 108 operates without stopping. Accordingly, in order to avoid paving machine stoppages or cooling of the paving material at the worksite 102, the system controller 124 monitors the pieces of equipment to determine whether to alter operation(s) at the worksite 102.

INDUSTRIAL APPLICATION

The present disclosure describes monitoring an amount of charge within batteries of pieces of equipment for use in determining whether to alter operations at a worksite. Whether the pieces of equipment have a sufficient amount of charge may be based on operating parameter(s) and an amount of material being processed by the pieces of equipment. In instances where the pieces of equipment do not include a sufficient amount of power, action(s) may be taken to reduce defects within a paving mat and/or a waste of paving material.

The systems disclosed herein allow for a system controller 124 to receive information associated with a paving operation at a worksite 102. Such information may include the operating parameter(s) 214, 224 of the pieces of equipment at the worksite 102, an amount of battery power within batteries of the pieces of equipment, and/or an amount of paving material being supplied to the worksite 102. Based on this information, the system controller 124 may use historical data 202 to determine an amount of power required of the pieces of equipment to perform their respective operation(s). That is, under a given set of operating parameter(s) 214, 224 and paving material being processed, the system controller 124 determines a corresponding amount of power required by the pieces of equipment, respectively. In instances where the pieces of equipment do not include sufficient power, the system controller 124 may dispatch (e.g., commission) other pieces of equipment to process the paving material, cease or reduce the supply of paving material to the worksite 102, and/or alter the operating parameter(s) 214, 224 of the pieces of equipment. Such action(s) serve to limit delays at the worksite that lead to cooling of the paving material and/or mat defects. Additionally, such action(s) may limit waste of the paving material. The system controller 124 continuously monitors the operating parameter(s) 214, 224 of the pieces of equipment at the worksite 102, an amount of battery power within batteries of the pieces of equipment, and/or an amount of paving material being supplied to the worksite 102 for making updated decisions as to whether the pieces of equipment include sufficient power.

Although the systems and methods are discussed in the context of a paving operation, the systems and methods discussed herein may be applied to a wide array of machines and vehicles across a wide variety of industries, such as construction, mining, farming, transportation, military, combinations thereof, or the like. For example, the system or methods discussed herein may be implemented within any vehicle, machine, or equipment with wheels, such as a combine.

While the foregoing invention is described with respect to the specific examples, the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative some embodiments that fall within the scope of the claims of the application.

The invention claimed is:

1. A system, comprising:
one or more processors; and
one or more non-transitory computer-readable media storing computer-executable instructions that, when executed by the one or more processors, cause the one or more processors to perform acts comprising:
receiving first data associated with paving material being prepared for a worksite at a paving material plant;
receiving second data associated with a first amount of power within a battery of a machine operating at the worksite;
receiving third data associated with one or more operating parameters of the machine to perform an operation at the worksite;
determining, based at least in part on the first data and the third data, a second amount of power for the machine to complete the operation;
determining that the first amount of power is less than the second amount of power;
determining, based at least in part on the first amount of power being less than the second amount of power, an action to be performed at the worksite or the paving material plant;
causing performance of the action; and
causing a notification of the action to be output on at least one of a first device associated with the machine or a second device associated with the paving material plant.

2. The system of claim 1, wherein the one or more operating parameters comprise at least one of:
a depth of a paving mat being prepared by the machine at the worksite;
a length of a paving mat being prepared by the machine at the worksite; or
a width of a paving mat being prepared by the machine at the worksite.

3. The system of claim 1, wherein the action comprises:
commissioning an additional machine at the worksite;
reducing an amount of the paving material being prepared by the paving material plant for the worksite; or
ceasing the paving material being supplied to the worksite.

4. The system of claim 1, the acts further comprising:
receiving fourth data associated with a third amount of power within a second battery of a second machine operating at the worksite;
receiving fifth data associated with one or more second operating parameters of the second machine to perform a second operation at the worksite;
determining, based at least in part on the first data and the fifth data, a fourth amount of power for the second machine to complete the second operation;
determining that the third amount of power is greater than the fourth amount of power; and
causing the second machine to perform the second operation.

5. The system of claim 1, the acts further comprising:
receiving fourth data associated with a third amount of power within a second battery of a second machine operating at the worksite;
receiving fifth data associated with one or more second operating parameters of the second machine to perform a second operation at the worksite;
determining, based at least in part on the first data and the fifth data, a fourth amount of power for the second machine to complete the second operation;
determining, that the third amount of power is less than the fourth amount of power; and
determining, based at least in part on the third amount of power being less than the fourth amount of power, a second action to be performed at the worksite or the paving material plant.

6. A method, comprising:
determining a current production rate of a piece of equipment processing first paving material at a worksite;
receiving first information indicative of an amount of power within an energy storage device of the piece of equipment;
receiving second information indicative of a characteristic of the worksite;
determining, based at least in part on the characteristic, a historical amount of power required by the piece of equipment;
determining, based at least in part on the current production rate, the historical amount of power, the first information, and the second information, a predicted production rate of the piece of equipment to process second paving material at the worksite;
determining, based at least in part on the predicted production rate of the piece of equipment, an amount of power required by the piece of equipment to process the second paving material at the worksite;
determining that the amount of power within the energy storage device of the piece of equipment is insufficient for the amount of power required by the piece of equipment to process the second paving material at the worksite; and
causing an action to be performed associated with reducing paving mat defects at the worksite.

7. The method of claim 6, further comprising determining the action to perform based at least in part on the amount of power within the energy storage device being insufficient for the amount of power required by the piece of equipment, the action comprising:
commissioning a second piece of equipment to replace the piece of equipment at the worksite;
commissioning a third piece of equipment at the worksite to charge the energy storage device of the piece of equipment;

transmitting a first request to a paving material plant to refrain from supplying the second paving material;
transmitting a second request to a paving material plant to reduce an amount of the second paving material; or
adjusting an operating parameter of the piece of equipment.

8. The method of claim 6, further comprising causing output of a notification, the notification indicating at least one of:
the action; or
that the amount of power within the energy storage device of the piece of equipment is insufficient for the amount of power required by the piece of equipment.

9. The method of claim 6, wherein the characteristic comprises:
a temperature of the paving material;
a temperature at the worksite;
a dimension of a paving mat being prepared at the worksite; or
a speed of the piece of equipment.

10. The method of claim 6, wherein the piece of equipment comprises:
a paving machine configured to deposit the first paving material at the worksite; or
a compacting machine configured to compact the first paving material at the worksite.

11. The method of claim 6, further comprising:
determining a second current production rate of a second piece of equipment processing the first paving material at the worksite;
receiving third information indicative of a second amount of power within a second energy storage device of the second piece of equipment;
determining, based at least in part on the second current production rate, the second information, and the third information, a second predicted production rate of the second piece of equipment to process the second paving material at the worksite;
determining, based at least in part on the second predicted production rate of the second piece of equipment, a second amount of power required by the second piece of equipment to process the second paving material at the worksite; and
determining that the second piece of equipment has sufficient power to process the second paving material at the worksite.

12. A method, comprising:
determining a first amount of power within a first energy storage device of a first piece of equipment operating at a worksite;
determining a second amount of power within a second energy storage device of a second piece of equipment operating at the worksite;
determining a first operating parameter of the first piece of equipment;
determining a second operating parameter of the second piece of equipment;
determining, for the first piece of equipment and based at least in part on the first operating parameter, a historical amount of power required to perform a first operation associated with processing paving material at the worksite;
determining, for the first piece of equipment, and based at least in part on the first operating parameter and the historical amount of power, a third amount of power for the first piece of equipment to perform the first operation associated with processing paving material at the worksite;
determining, for the second piece of equipment based at least in part on the second operating parameter, a fourth amount of power for the second piece of equipment to perform a second operation associated with processing the paving material at the worksite;
determining that at least one of:
the first piece of equipment is unable to perform the first operation based at least in part on the third amount of power being greater than the first amount of power, or
the second piece of equipment is unable to perform the second operation based at least in part on the fourth amount of power being greater than the second amount of power;
causing output of a notification that indicates at least one of:
the first piece of equipment is unable to perform the first operation, or
the second piece of equipment is able to perform the second operation; and
causing an action to be performed at the worksite by at least one of the first piece of equipment or the second piece of equipment.

13. The method of claim 12, the action comprising at least one of:
decommissioning the at least one of the first piece of equipment or the second piece of equipment,
commissioning a third piece of equipment to replace the first piece of equipment;
commissioning a fourth piece of equipment to replace the second piece of equipment; or
commissioning a fifth piece of equipment to recharge the at least one of the first piece of equipment or the second piece of equipment.

14. The method of claim 12, further comprising:
transmitting a first request to a paving material plant preparing the paving material to cease a supply the paving material to the worksite, or
transmitting a second request to a paving material plant preparing the paving material to reduce a supply of the paving material to the worksite.

15. The method of claim 12, wherein:
the first piece of equipment comprises a paving machine;
the second piece of equipment comprises a compacting machine;
the first operating parameter comprises:
a depth of a paving mat prepared by the paving machine,
a width of a paving mat prepared by the paving machine,
a length of a paving mat prepared by the paving machine, or
a speed of the paving machine; and
the second operating parameter comprises:
a vibrational frequency of the compacting machine,
a vibrational amplitude of the compacting machine, or
a speed of the compacting machine.

16. The method of claim 12, wherein the historical amount of power comprises a first historical amount of power, the method further comprising:
determining, for the second piece of equipment and based at least in part on the second operating parameter, a second historical amount of power to perform the second operation, wherein:
  determining the fourth amount of power is further based at least in part on the second historical amount of power.

17. The method of claim 12, further comprising:
determining paving material currently being supplied by a paving material plant to the worksite;
determining, for the first piece of equipment, a fifth amount of power to process the paving material currently being supplied to the worksite; and
determining, for the second piece of equipment, a sixth amount of power to process the paving material currently being supplied to the worksite.

18. The method of claim 17, wherein determining that the at least one of:
  the first piece of equipment is unable to perform the first operation is further based at least in part on the fifth amount of power; or
  the second piece of equipment is unable to perform the second operation is further based at least in part on the sixth amount of power.

19. The method of claim 12, further comprising:
determining a fifth amount of power within a third energy storage device of a third piece of equipment operating at the worksite;
determining a third operating parameter of the third piece of equipment;
determining, for the third piece of equipment and based at least in part on the third operating parameter, a sixth amount of power for the third piece of equipment to perform a third operation associated with processing the paving material at the worksite; and
determining that the third piece of equipment is able to perform the third operation.

* * * * *